United States Patent
Acreman et al.

(10) Patent No.: US 11,061,283 B2
(45) Date of Patent: Jul. 13, 2021

(54) QUANTUM ROD TRANSFLECTIVE DISPLAY WITH QUANTUM ROD BLOCK COPOLYMER LAYER

(71) Applicant: Sharp Kabushiki Kaisha, Osaka (JP)

(72) Inventors: Andrew Acreman, Oxford (GB); Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/600,756

(22) Filed: Oct. 14, 2019

(65) Prior Publication Data
US 2021/0109381 A1 Apr. 15, 2021

(51) Int. Cl.
*G02F 1/1337* (2006.01)
*G02F 1/1335* (2006.01)

(52) U.S. Cl.
CPC ...... *G02F 1/1337* (2013.01); *G02F 1/133514* (2013.01); *G02F 1/133528* (2013.01); *G02F 1/133757* (2021.01); *G02F 2202/36* (2013.01)

(58) Field of Classification Search
CPC ............. G02F 1/1337; G02F 1/133528; G02F 2202/36; G02F 1/017; G02F 1/133514; G02F 1/133555
See application file for complete search history.

(56) References Cited

U.S. PATENT DOCUMENTS 7,965,357 B2 6/2011 Van De Witte et al.
9,983,439 B2 5/2018 Mizunuma et al.
(Continued)

FOREIGN PATENT DOCUMENTS

KR 20070094679 9/2007

OTHER PUBLICATIONS

Sundrani et al.: "Hierarchical Assembly and Compliance of Aligned Nanoscale Polymer Cylinders in Confinement", Langmuir 2004, 20, 5091-5099.
(Continued)

*Primary Examiner* — Jia X Pan
(74) *Attorney, Agent, or Firm* — Renner, Otto, Boisselle & Sklar, LLP

(57) ABSTRACT

A quantum rod display device has an enhanced alignment of the quantum rods that is achieved by employing an aligned block copolymer material to align the quantum rods. The display device may be a transflective display device. The display device includes a liquid crystal layer and a quantum rod structure optically coupled to the liquid crystal layer. The quantum rod structure includes an aligned block copolymer material including a first polymer strain and a second polymer strain that are aligned relative to each other, and quantum rods that are embedded within either the first polymer strain or the second polymer strain, and the quantum rods are aligned by the alignment of the polymer strain in which the quantum rods are embedded. The quantum rod structure may be unpatterned whereby the quantum rod structure emits light of a single color or a combined color emission, or patterned into regions whereby at least two of the regions include quantum rods that emit light of different colors. The quantum rods may include a functionalization ligand that renders the quantum rods preferentially soluble into the polymer strain in which the quantum rods are aligned.

18 Claims, 28 Drawing Sheets

(56) References Cited

U.S. PATENT DOCUMENTS

| | | | |
|---|---|---|---|
| 2013/0335677 A1 | 12/2013 | You | |
| 2014/0362556 A1* | 12/2014 | Cho | G02F 1/133617 362/19 |
| 2015/0146452 A1* | 5/2015 | Kim | C09K 11/883 362/611 |
| 2016/0003998 A1* | 1/2016 | Benoit | B82Y 20/00 349/71 |
| 2016/0195775 A1* | 7/2016 | Lee | G02F 1/133345 349/43 |
| 2017/0003548 A1* | 1/2017 | Mizunuma | G02F 1/133617 |
| 2017/0031194 A1* | 2/2017 | Banin | G02F 1/133617 |
| 2017/0031211 A1* | 2/2017 | Park | G02F 1/133528 |
| 2017/0123267 A1* | 5/2017 | Yanai | G02B 5/3025 |
| 2017/0153007 A1* | 6/2017 | Banin | G02F 1/133606 |
| 2017/0255060 A1* | 9/2017 | Kim | G02F 1/133516 |
| 2017/0256752 A1* | 9/2017 | Gee | H01L 51/5293 |
| 2018/0031883 A1* | 2/2018 | Li | C09K 19/12 |
| 2018/0088370 A1* | 3/2018 | Cheng | G02F 1/133528 |
| 2018/0129101 A1* | 5/2018 | Kawahira | G02F 1/133345 |

OTHER PUBLICATIONS

Hore et al.: "Strategies for dispersing, assembling, and orienting nanorods in polymers", Current Opinion in Chemical Engineering 2013, 2:95-102.

Roberts et al.: "Nanowire polarizers by guided self-assembly of block copolymers", DOI: 10.1117/1.JNP.8.083091.

Bates et al.: "Block Copolymers—Designer Soft Materials", Physics Today 52, 2, 32 (1999); https://doi.org/10.1063/1.882522.

* cited by examiner

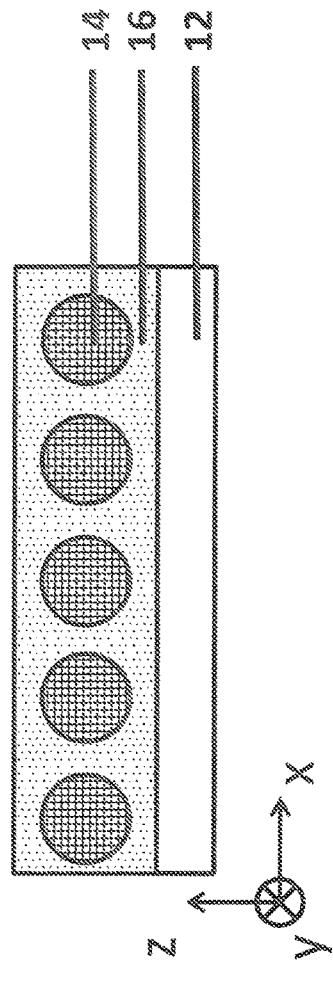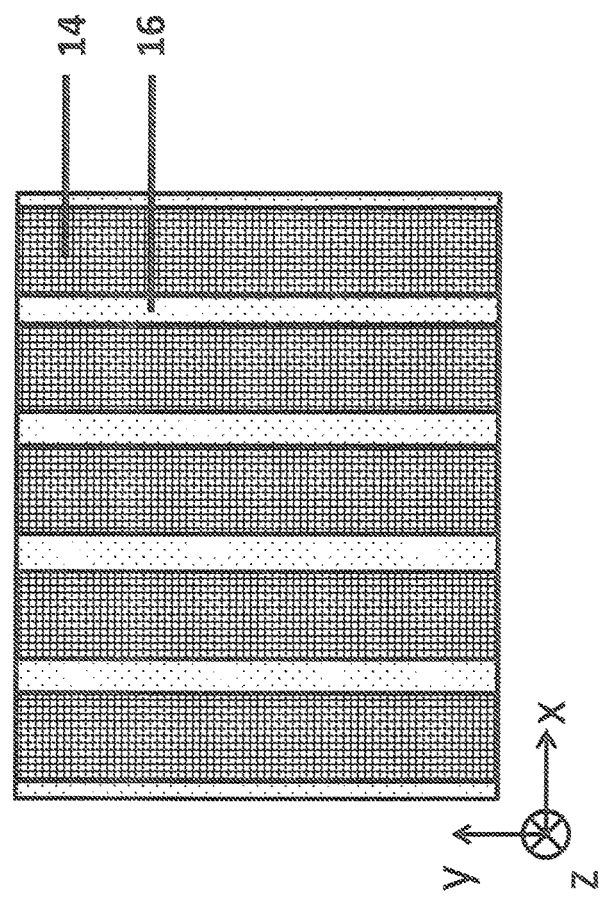
Fig. 3A
Fig. 3B

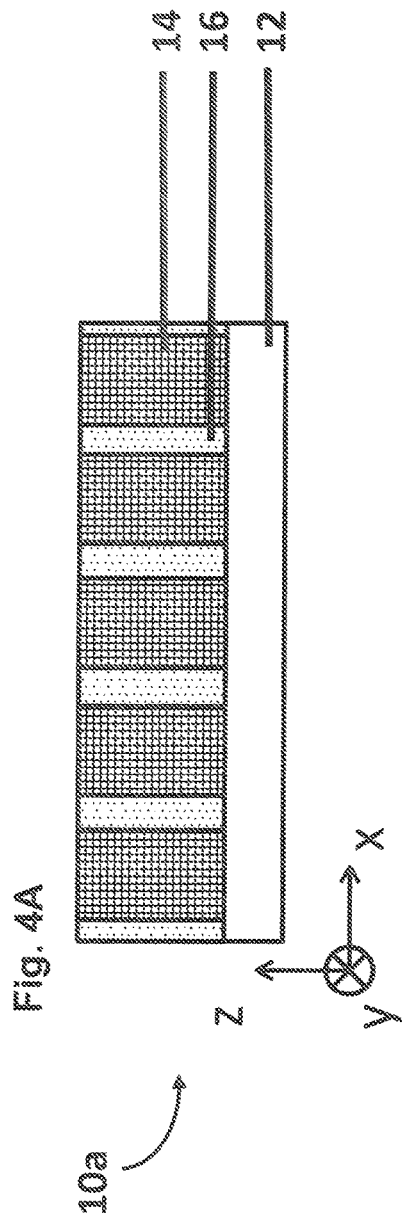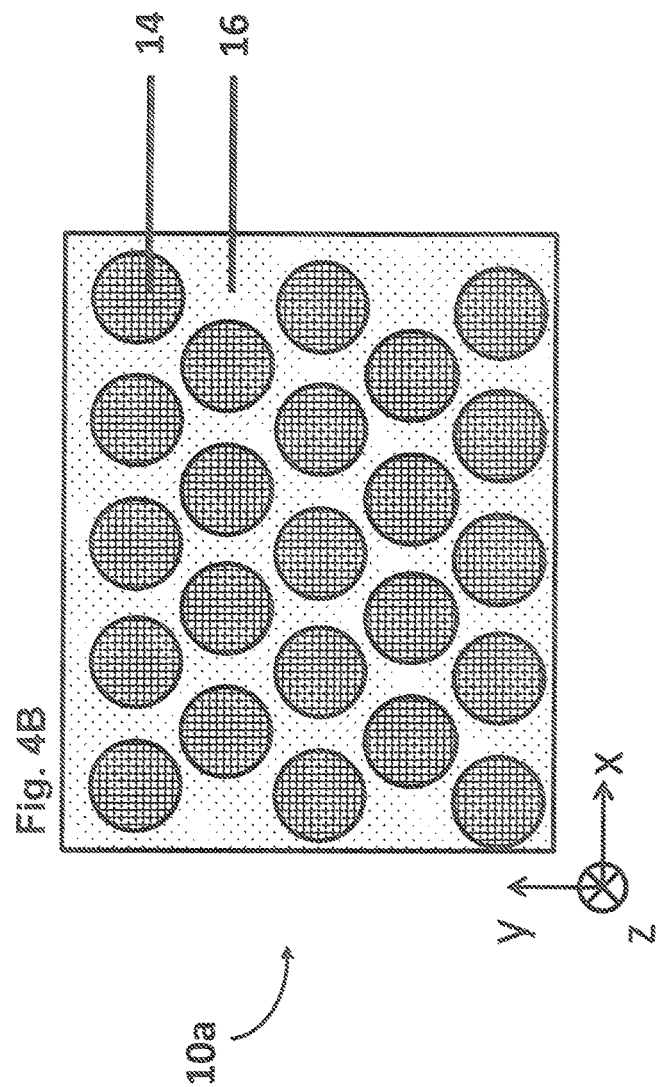

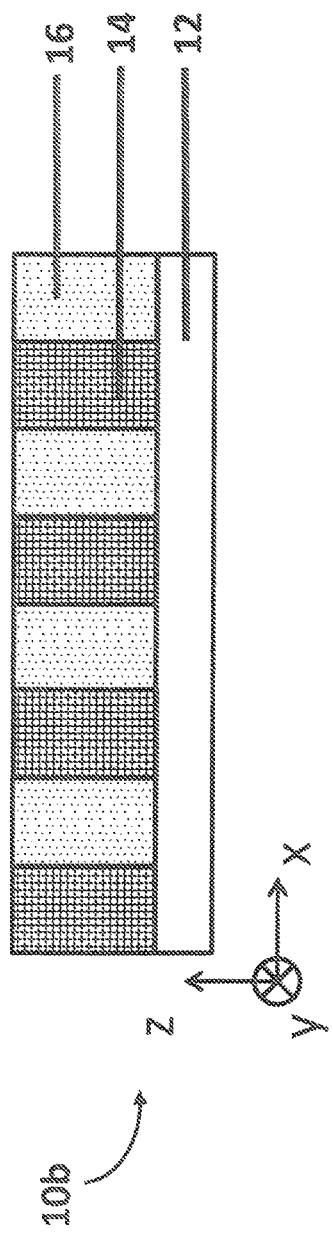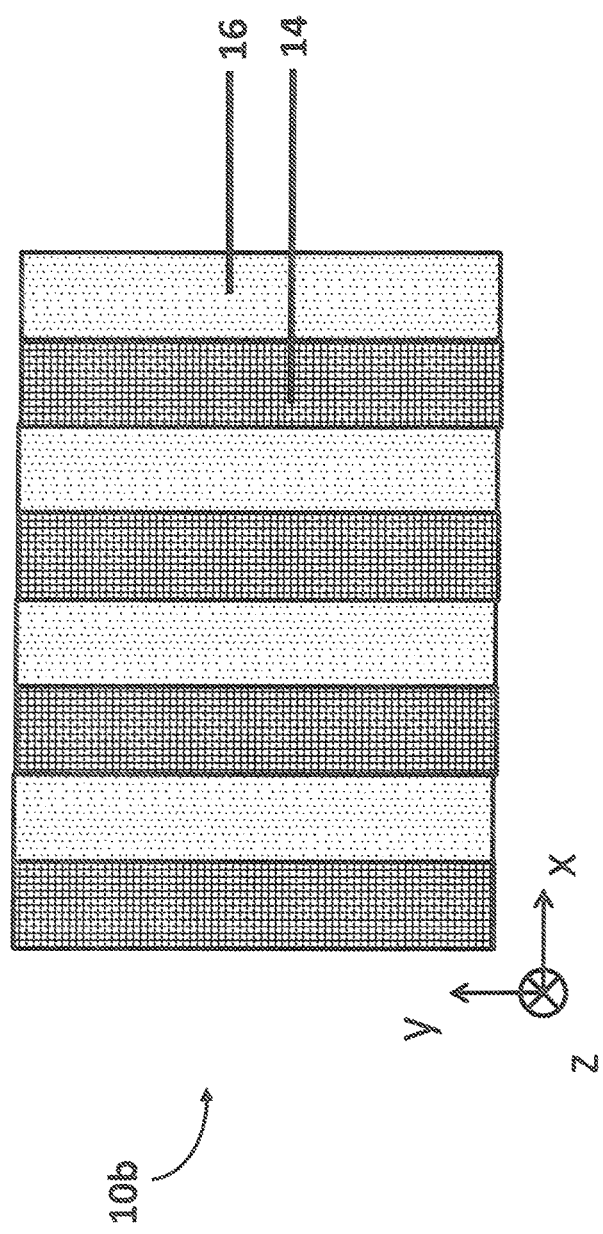

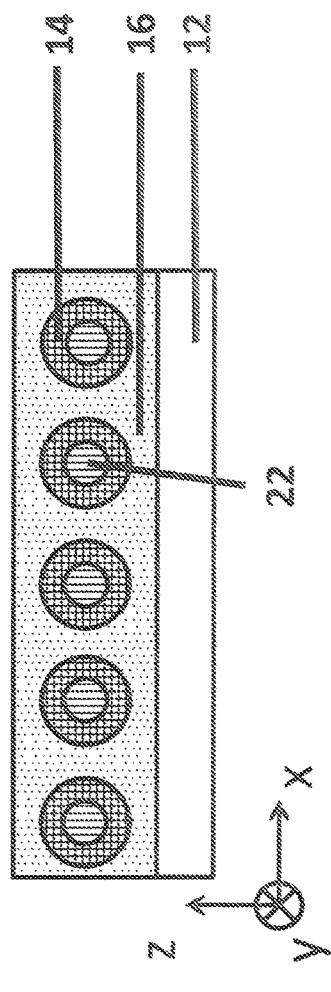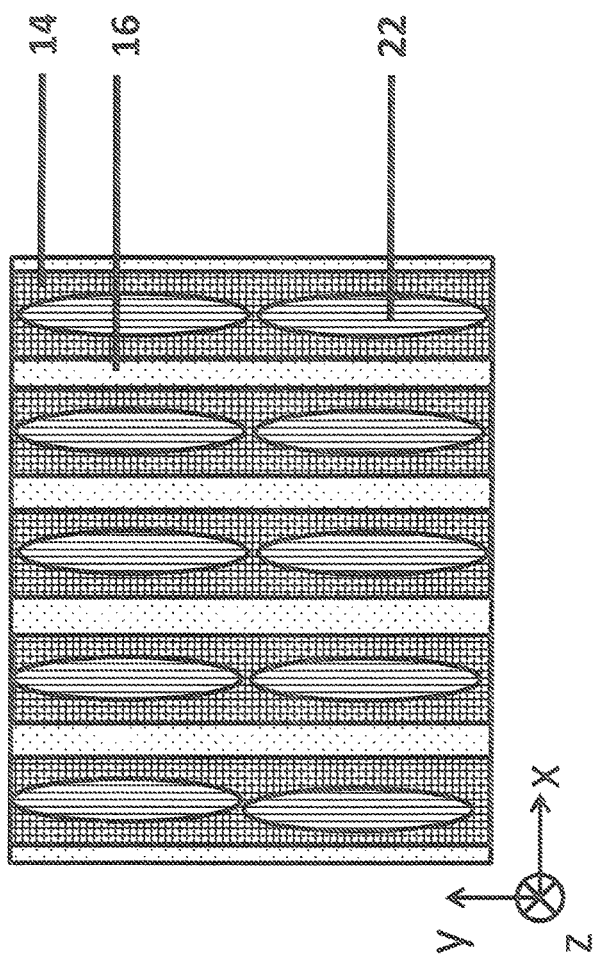

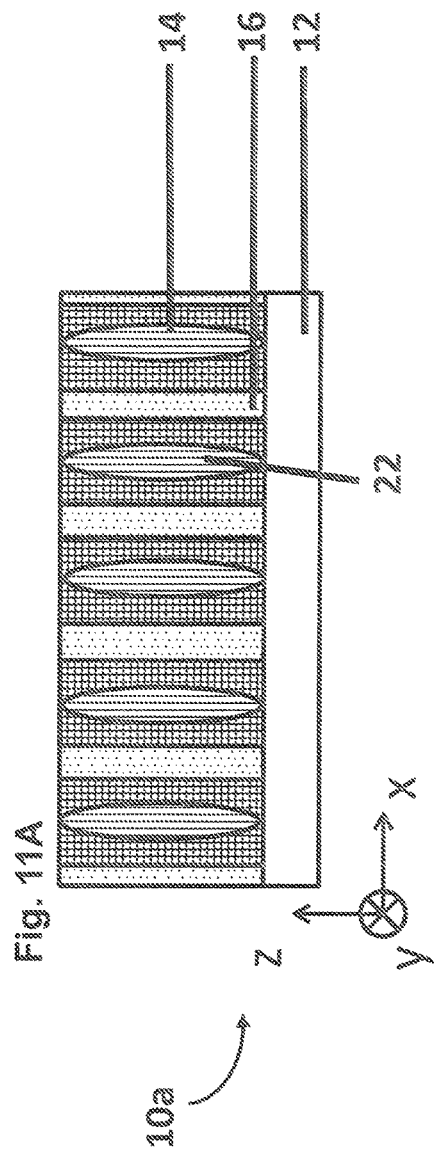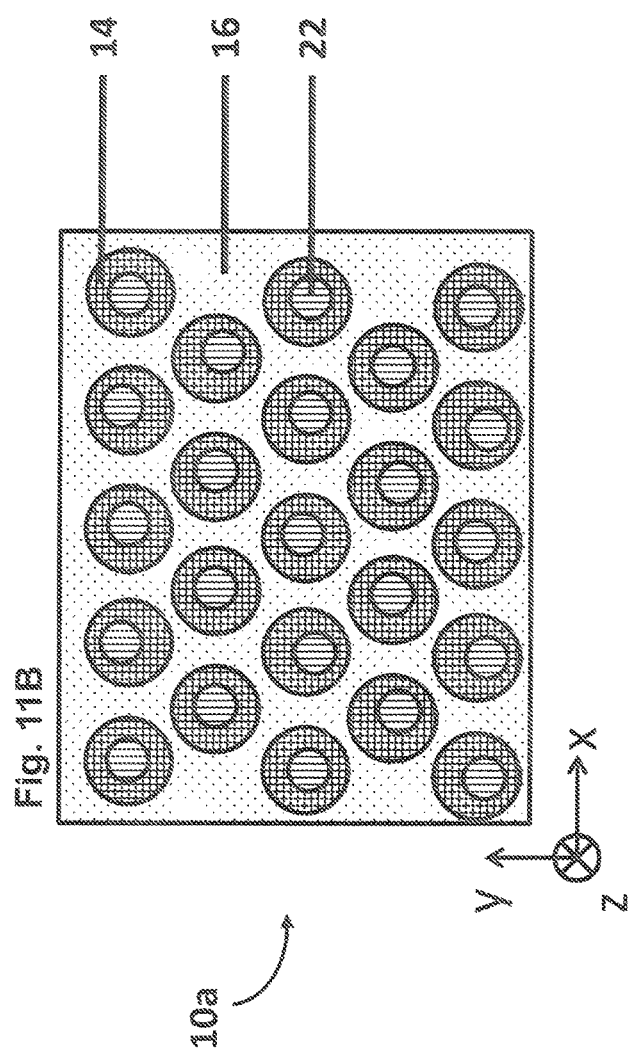

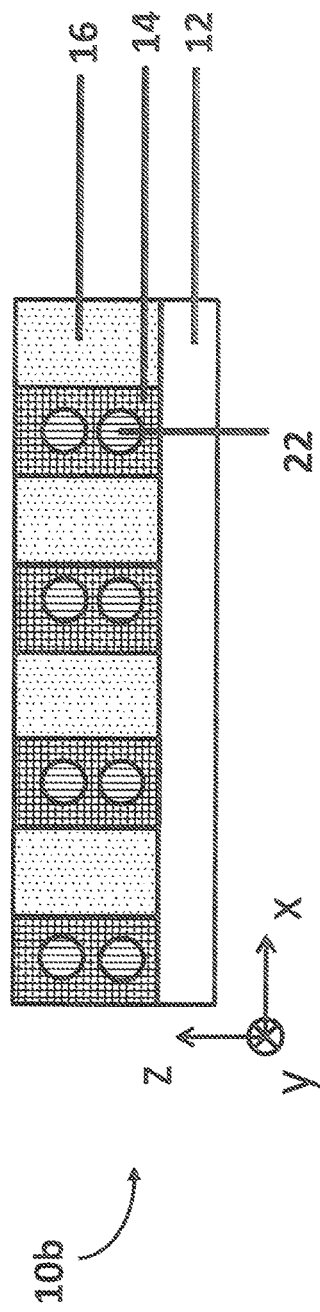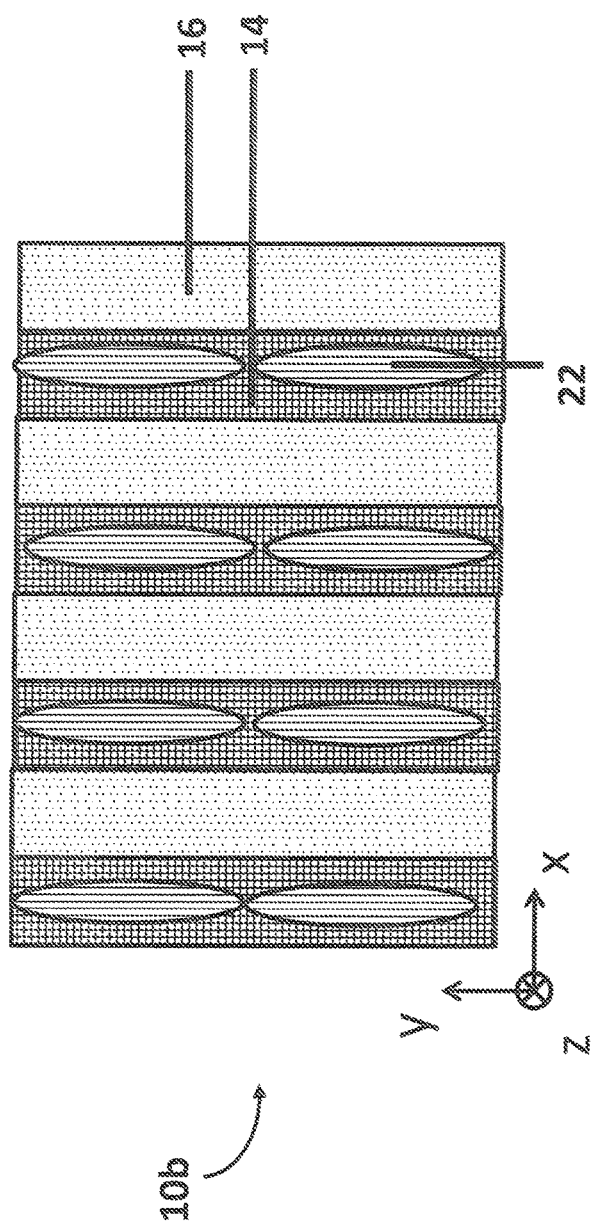

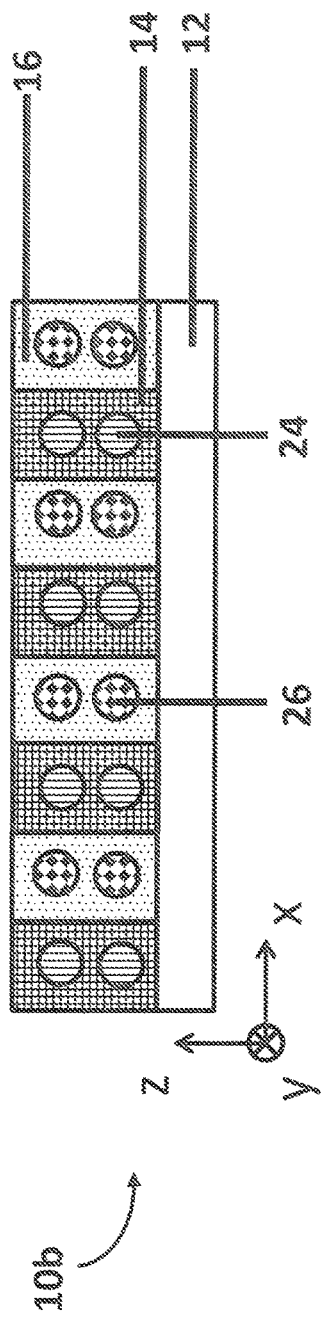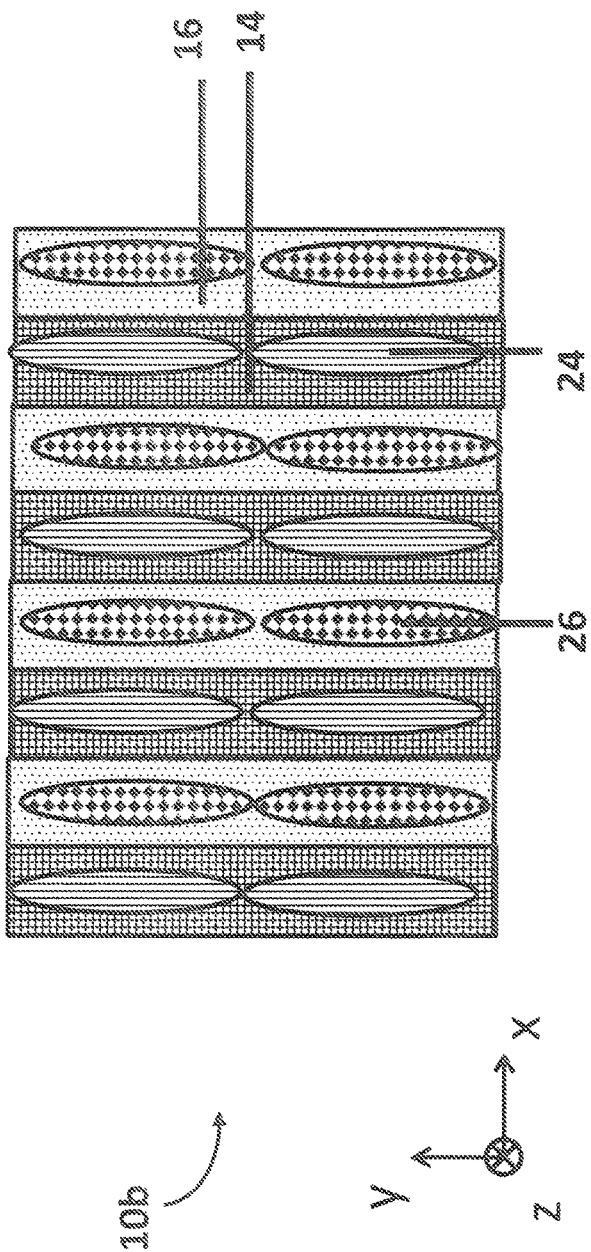

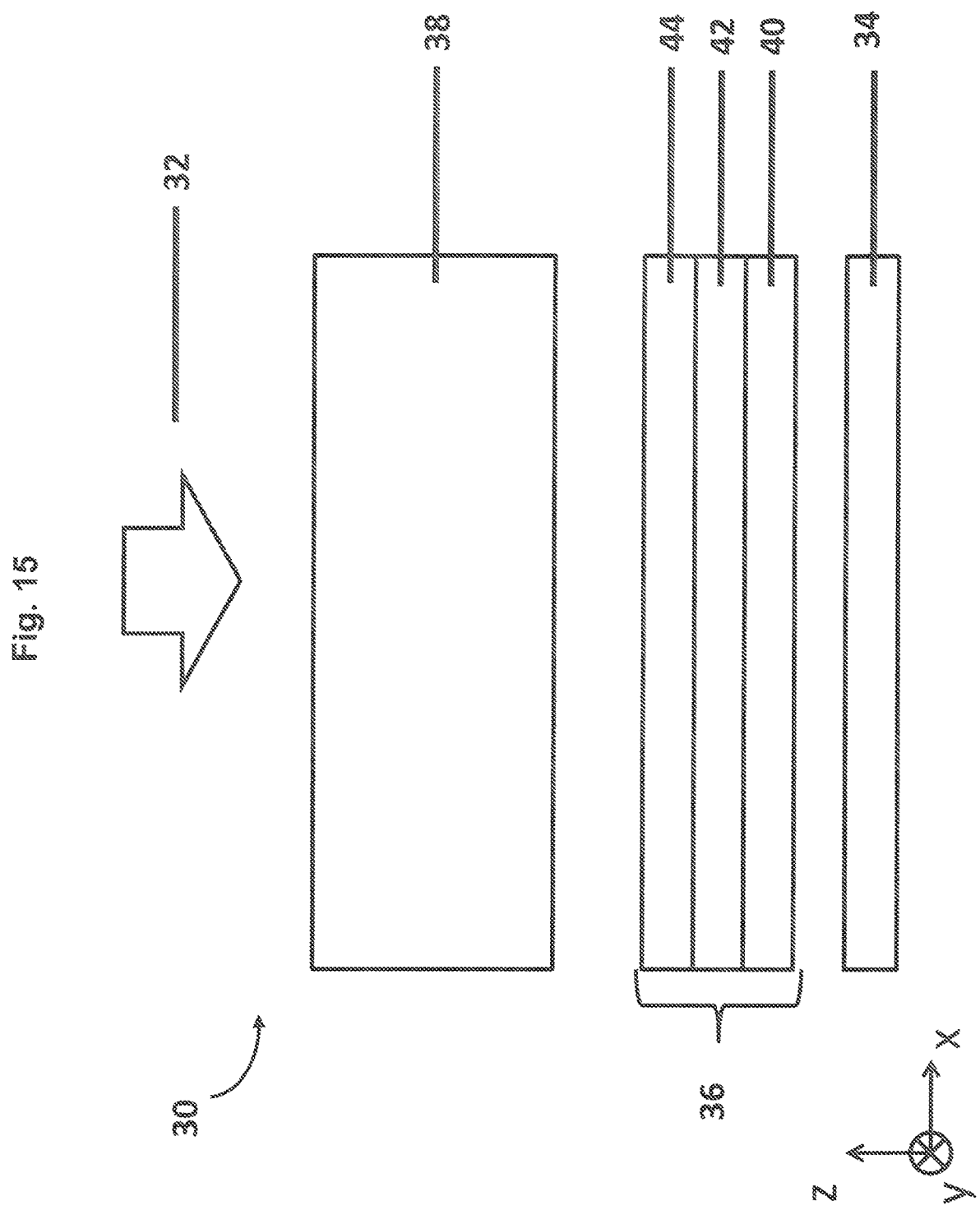

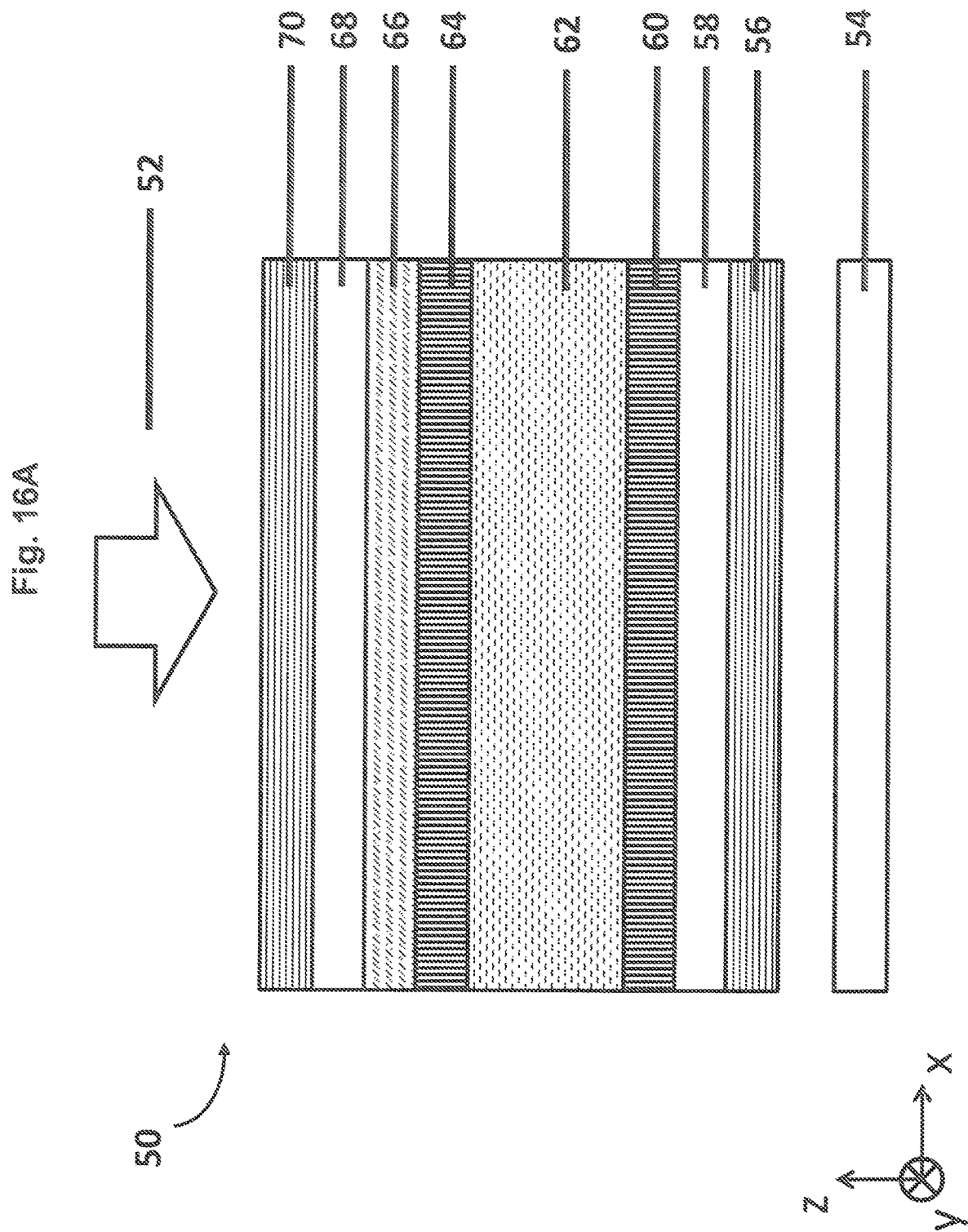

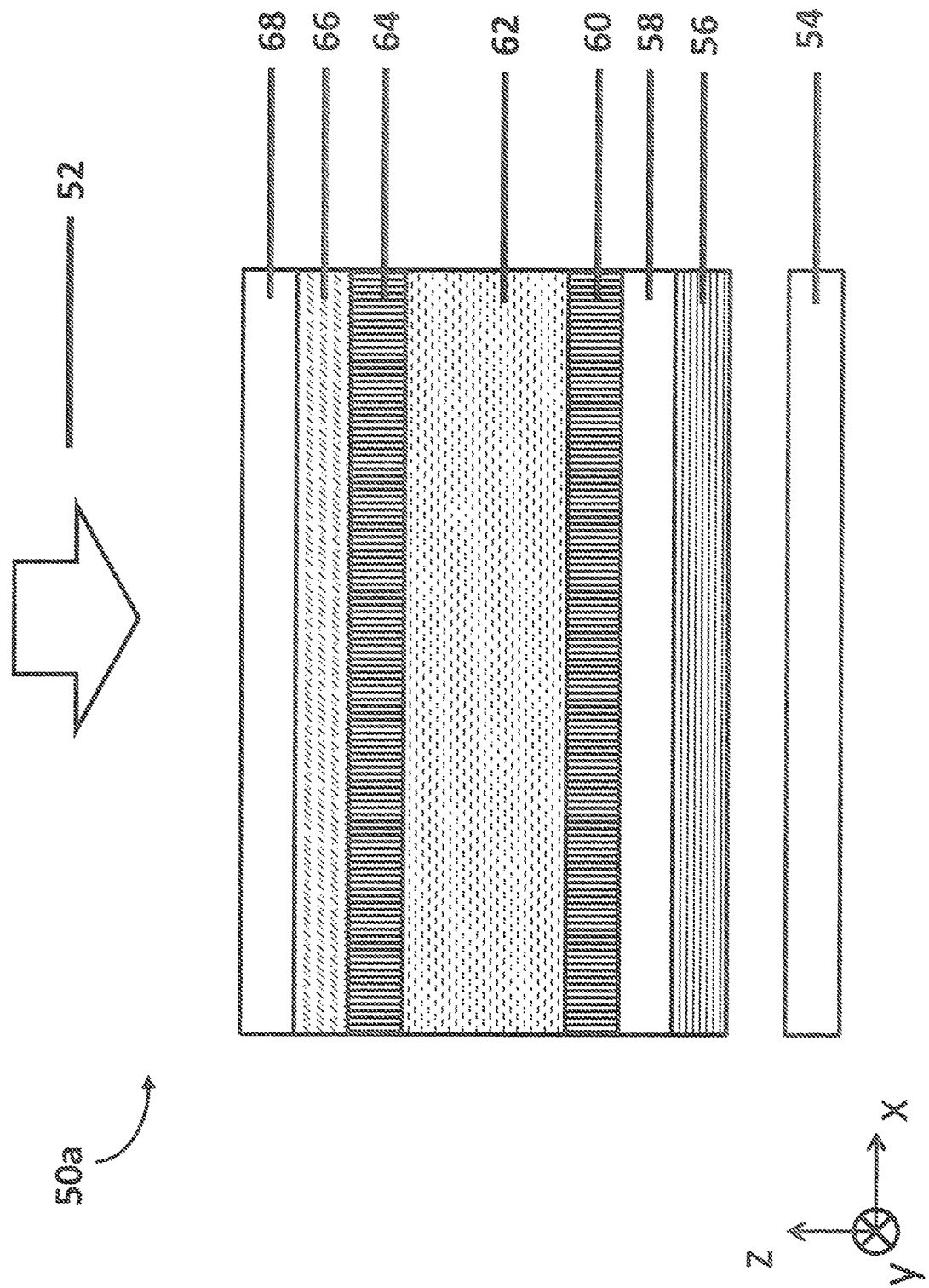

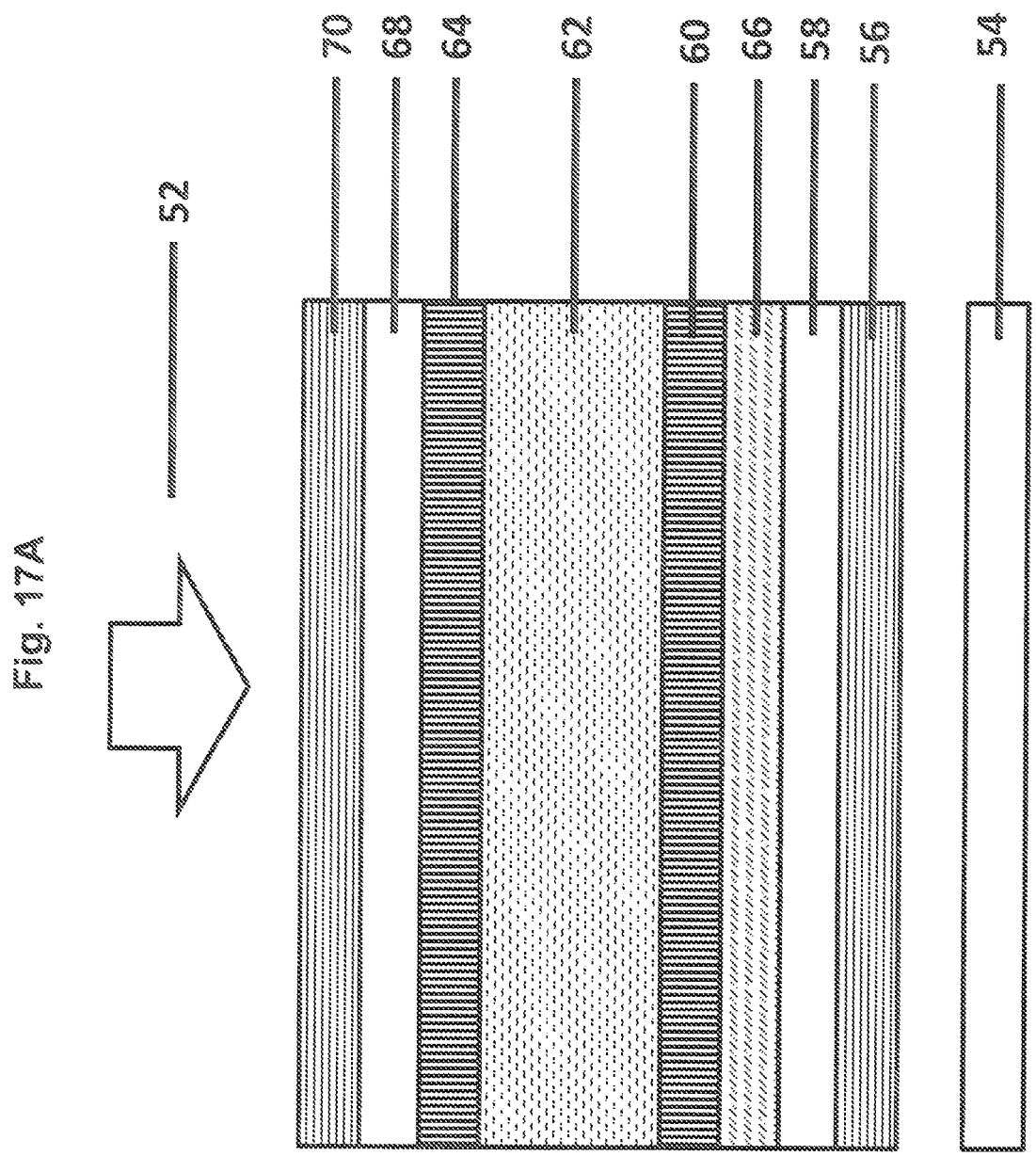

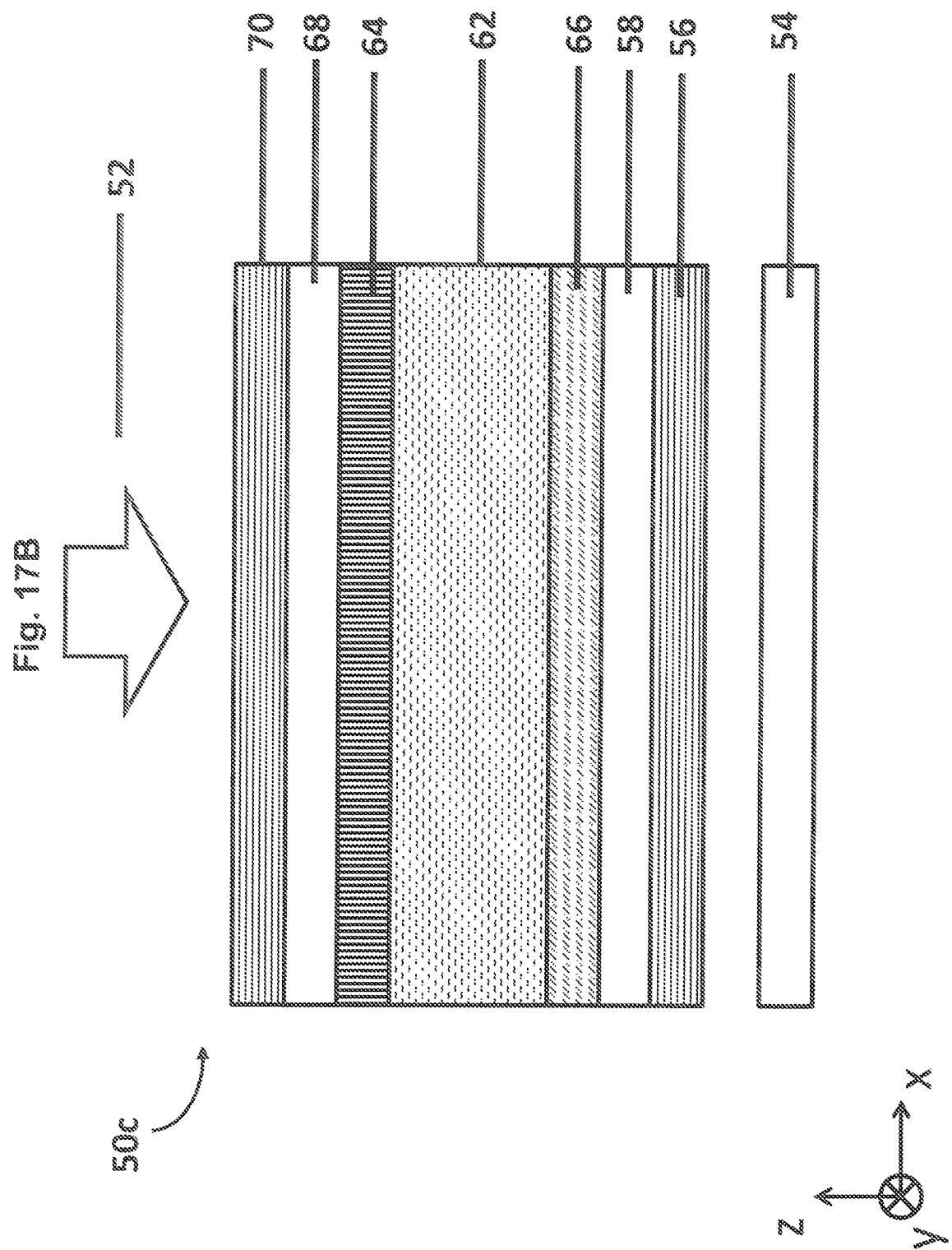

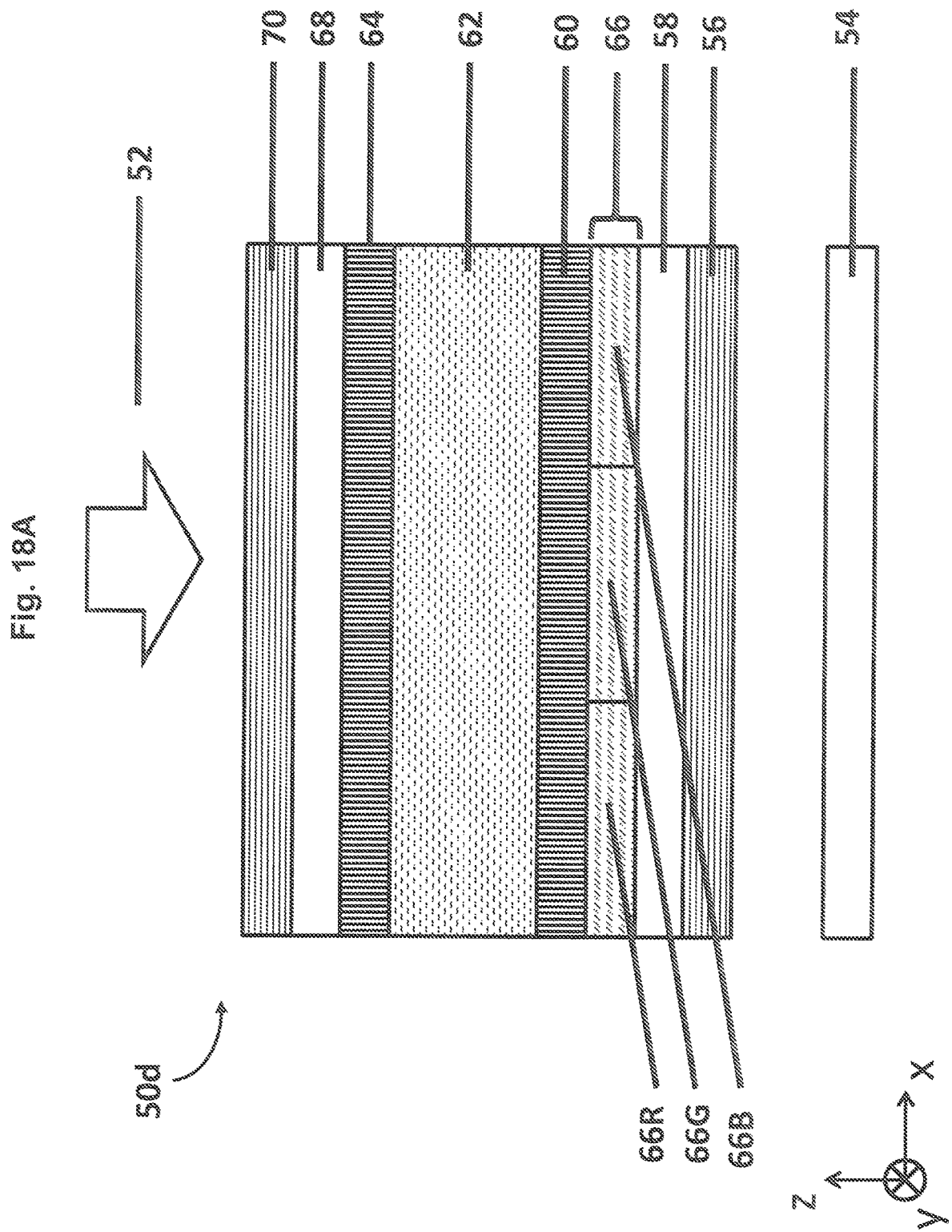

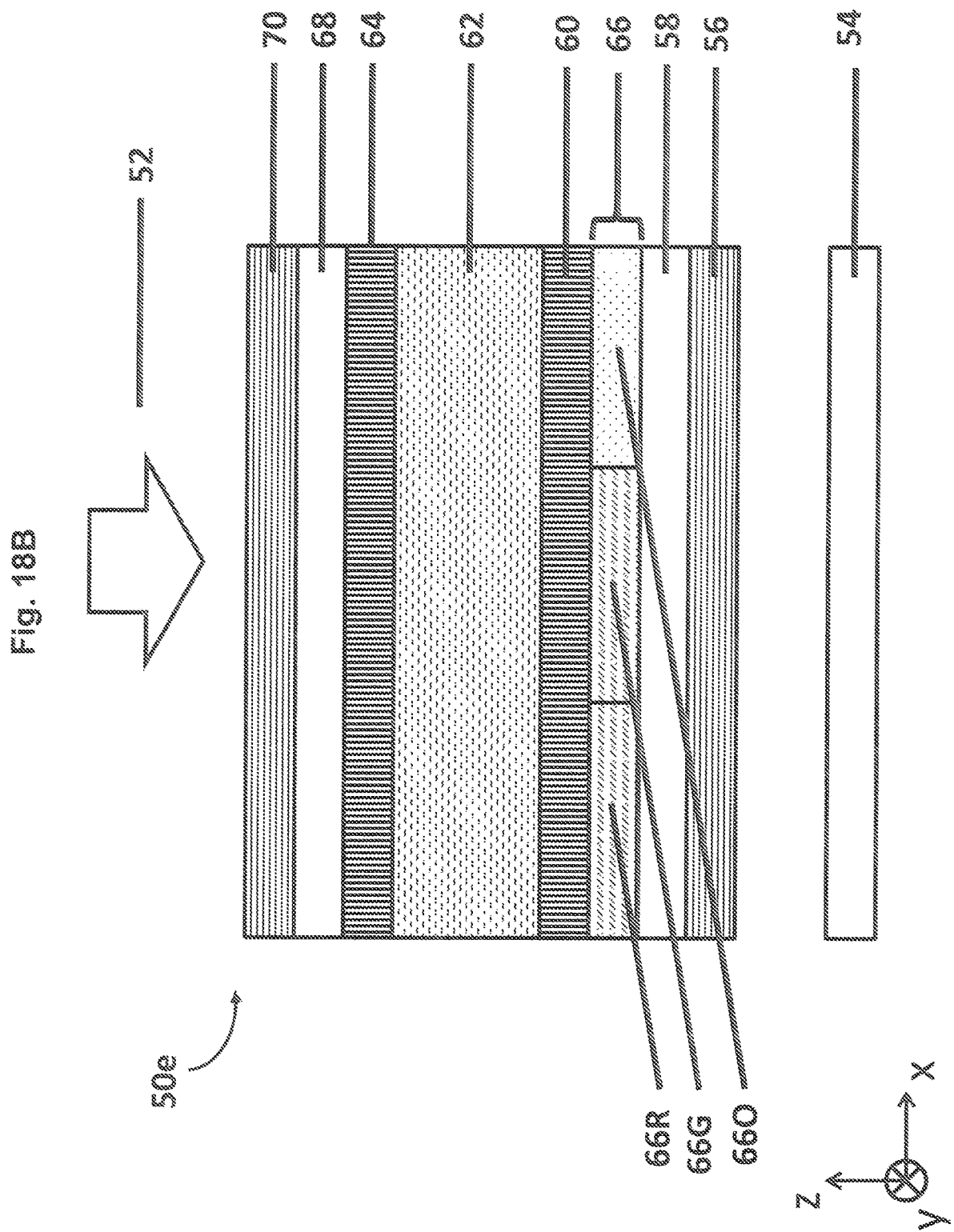

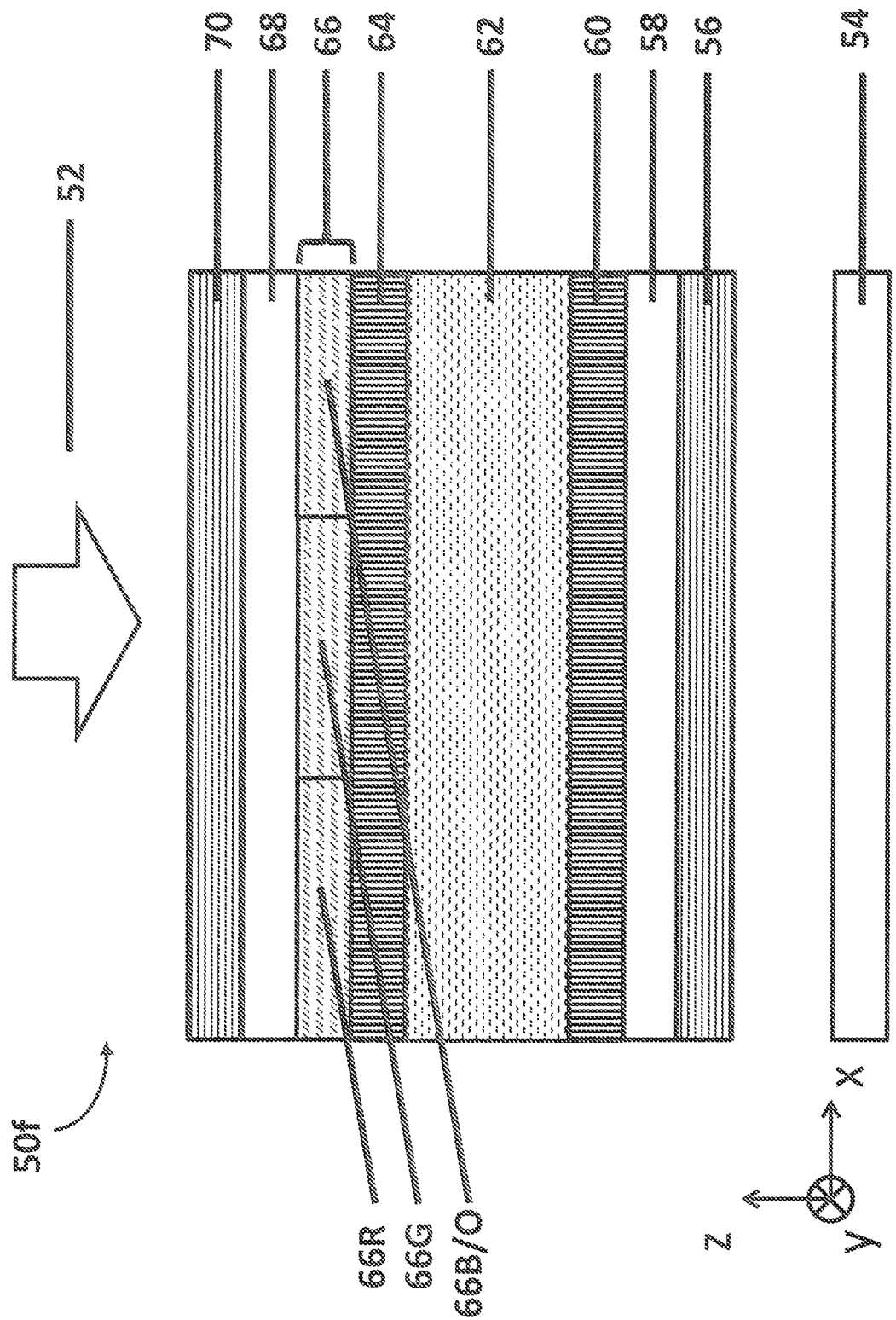

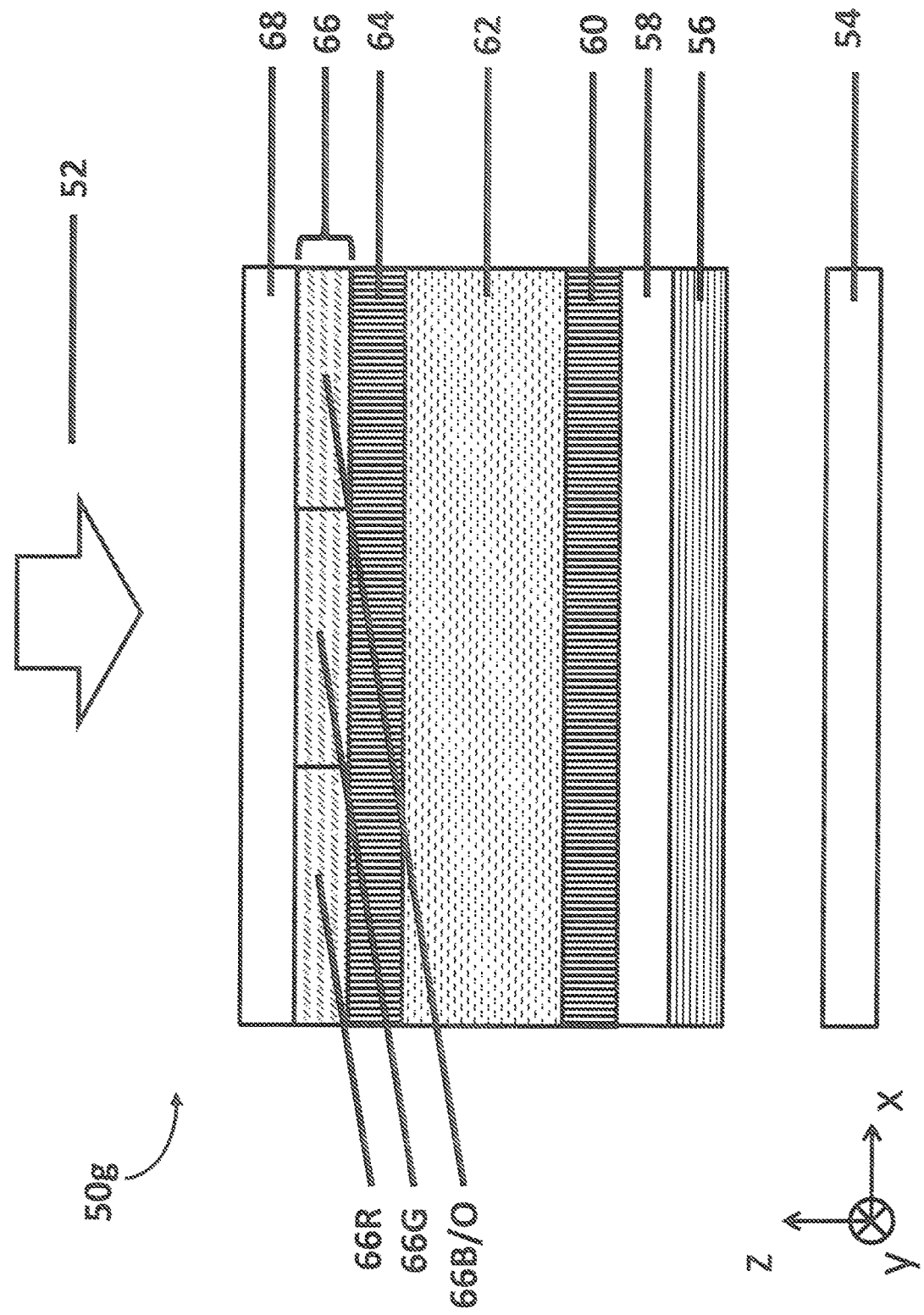

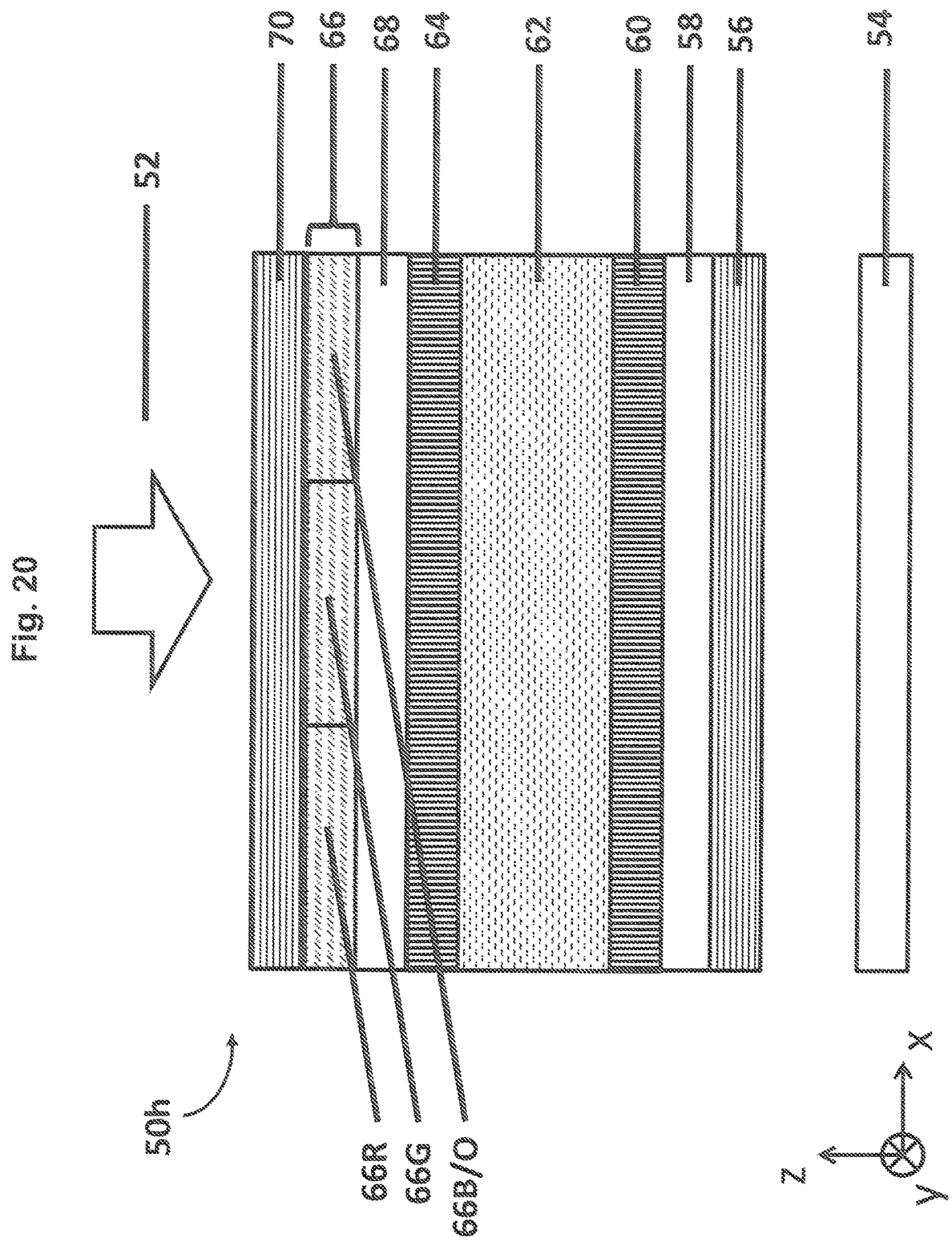

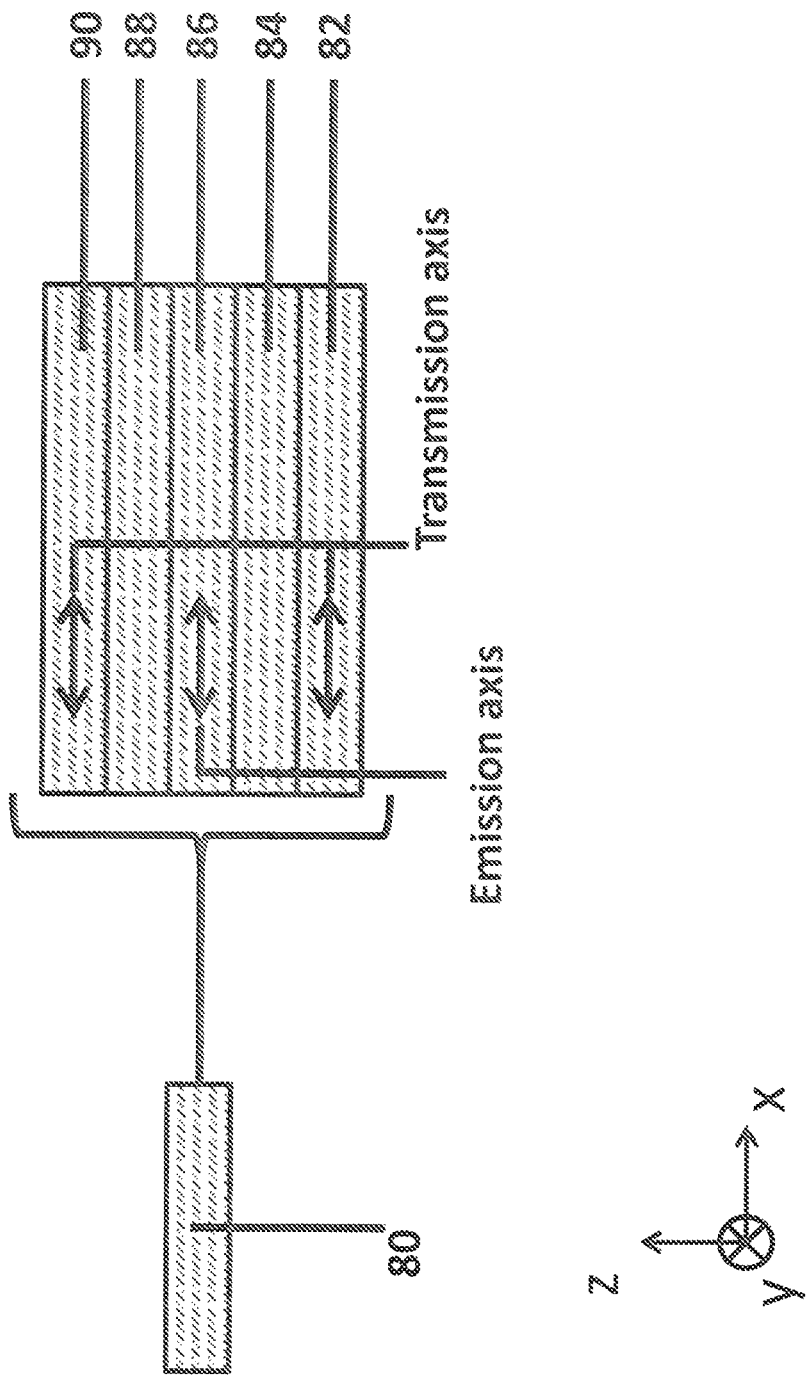

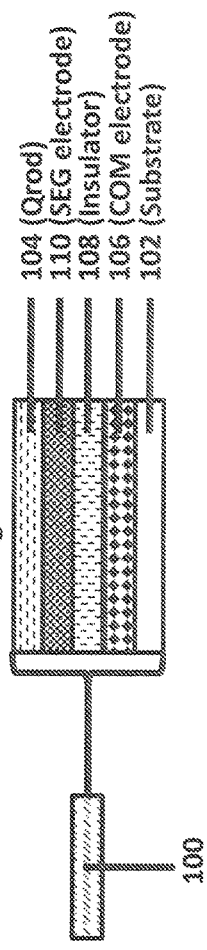
Fig. 22A
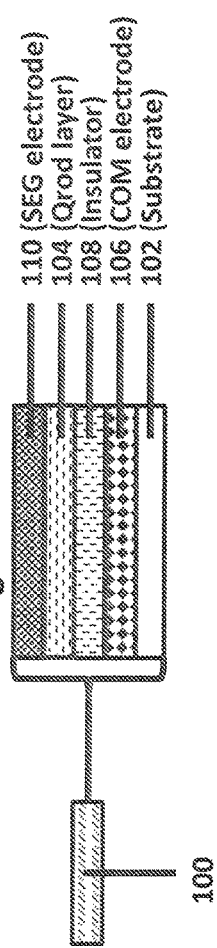
Fig. 22B
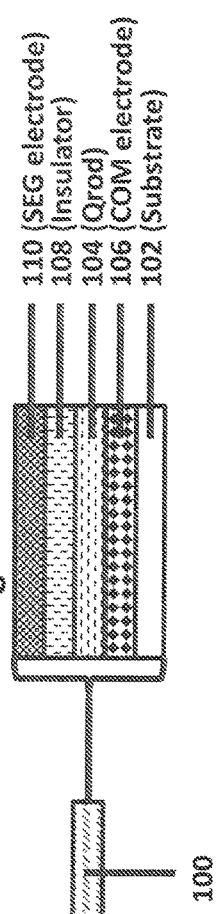
Fig. 22C
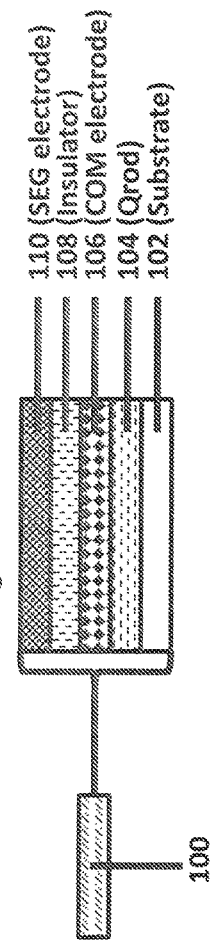
Fig. 22D
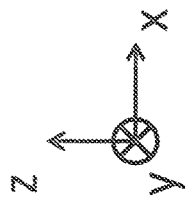

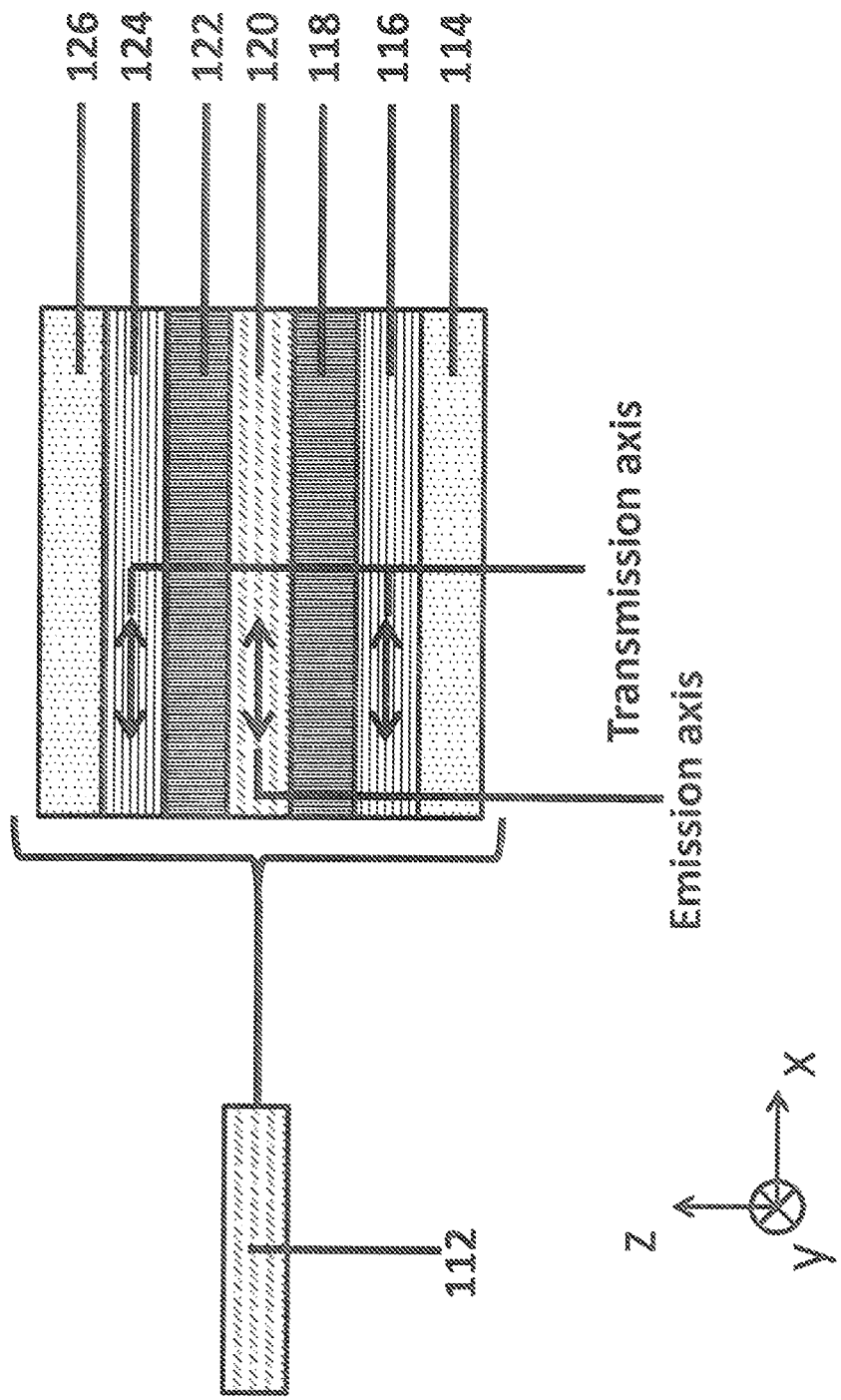

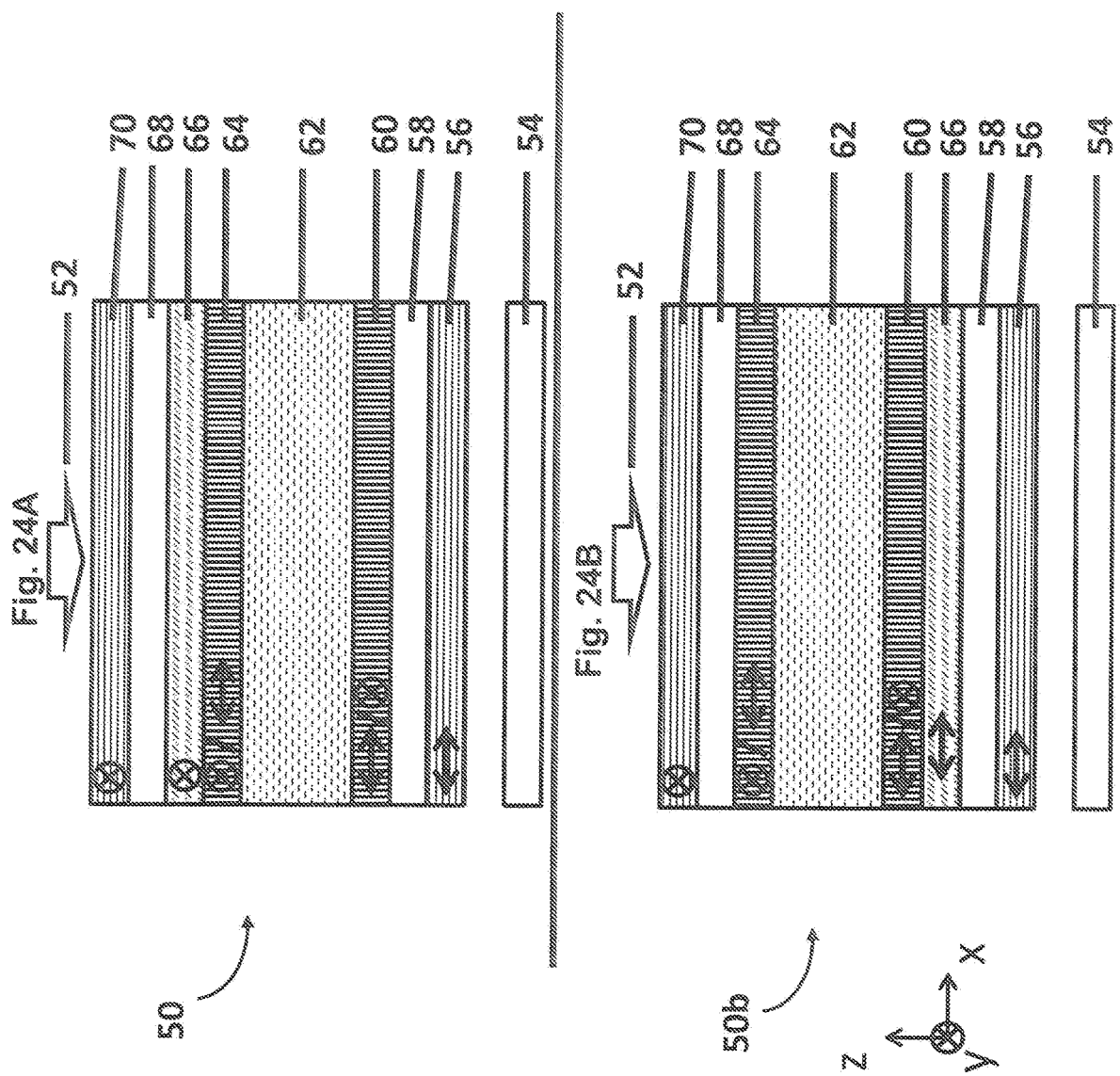

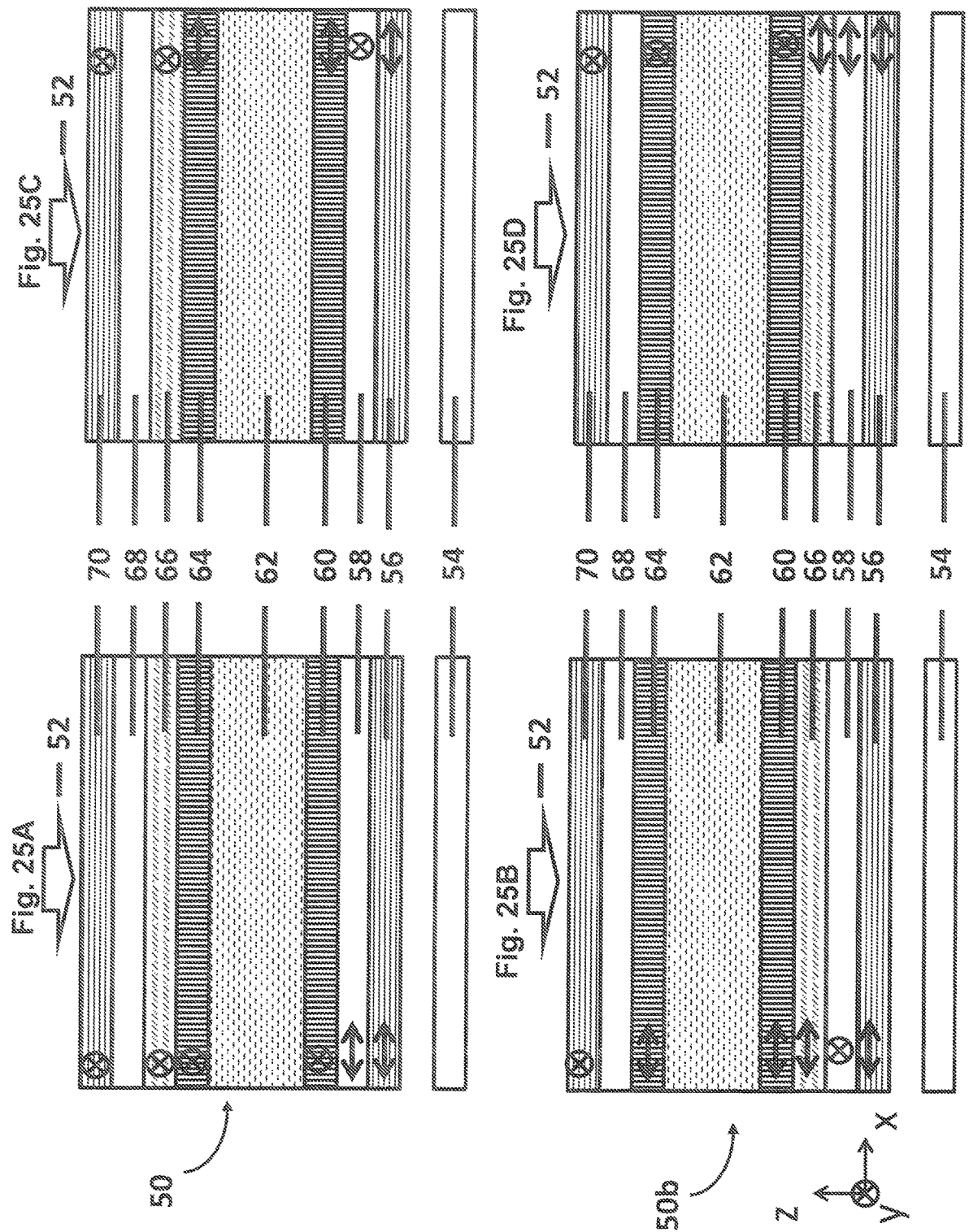

QUANTUM ROD TRANSFLECTIVE DISPLAY WITH QUANTUM ROD BLOCK COPOLYMER LAYER

TECHNICAL FIELD

The present disclosure relates generally to display devices and, more particularly, to transflective liquid crystal display devices using quantum rods.

BACKGROUND ART

Methods and systems using nanoparticles to improve the contrast ratio and brightness of a display have been used to enable better image quality. Conventional liquid crystal displays (LCDs), such as US 2016/0003998 (Benoit et al., published Jan. 7, 2016), may use an in-plane switching mode in combination with a quantum dot enhancement film (QDEF). US 2013/0335677 (You, published Dec. 19, 2013) describes the use of a blue backlight in combination with a QDEF sheet, a dichroic filter (to recycle blue light back to the QDEF sheet), and a conventional color filter. The QDEF sheet may contain a polymer host with a uniform mixture of quantum dots (Qdots), which converts a first portion of the blue light into red and green wavelengths. KR 20070094679 (Jiang et al.) describes an LCD that incorporates patterned quantum dot color filters that can be used to replace a conventional absorptive color filter for red and green sub-pixels in combination with a blue backlight, and an LC layer which acts as an optical shutter. U.S. Pat. No. 9,983,439 (Mizunuma et al., issued May 29, 2018) describes a display device which uses a patterned quantum rod color filter to emit polarized light with a wavelength different from the excitation light. US 2017/0255060 (Kim et al., published Sep. 7, 2017) describes a color filter that uses quantum rods to emit polarized light.

Transflective display devices attempt to improve image quality in all viewing conditions. The term "transflective" is a combination term of transmissive and reflective. Conventional transflective devices, such as U.S. Pat. No. 7,965,357 (Van De Witte et al., issued Jun. 21, 2011), include an LCD containing a reflector which is patterned to contain apertures. The device acts so that a single pixel can operate as both a reflective and transmissive display. The optics in such a system are designed such that in the dark state of the display, both light from the backlight (which passes though the apertures in the patterned reflector) and ambient light (reflected from the patterned reflector) are absorbed by a polarizer layer, while in the bright state both ambient light and light from the backlight are emitted by the device. The patterned reflector results in low efficiency because a significant amount of light emitted by the backlight is blocked.

In an exemplary configuration of a transflective display device, a single area transflective device is formed which does not require a patterned reflector. Such device incorporates a patterned quantum dot color filter which is on the non-viewing side of the LCD. Light from the backlight stimulates the quantum dots, which is then selectively transmitted by the LCD layer. In high ambient light conditions, the quantum dots absorb and re-emit the ambient light supplementing the light from the backlight. Such a device is still inefficient as it requires a high-quality internal polarizer due to the depolarization effects of the quantum dots. The interaction between the quantum dots and the internal polarizer means that approximately 50% of the light from the backlight is lost as well as approximately 75% of ambient light. Accordingly, there is a need in the art for improved transflective displays that operate effectively under all lighting conditions.

SUMMARY OF INVENTION

The present application relates to liquid crystal display (LCD) devices that provide enhanced efficiency by superior alignment of nanorods for the control of light. Embodiments described in the present application include devices incorporating aligned nanorods, such as quantum rods or plasmonic nanorods, wherein the nanorods have been aligned by a block copolymer material. Related methods of aligning nanorod materials are described using block copolymer films. With reference to "nano" particles and nanorods described herein, the nano prefix indicates that the particle has dimensions of the order of 1-1000 nm. The term nanoparticle can refer to any particle having dimensions in this range, such as nanorods, nanospheres, or nano-disks for example. The "rod" suffix indicates that the nanoparticle is anisotropic with one directional axis being substantially longer than the other axes.

A method of aligning nanorod materials using a block copolymer film is described. Alignment is performed by functionalizing the nanoparticle in such a manner as to encourage preferential diffusion into one of the two polymer material components of a block copolymer. The nanorod is then aligned by space limitations of the associated polymer material within the block copolymer phase or material. The functionalization of the nanoparticle refers to the addition of chemicals that are chemically bonded to the surface of the nanorod to achieve preferential diffusion into one of the block copolymer components. The bonding of the functionalization chemical may be covalent, ionic, or be an intermediate bond.

Exemplary embodiments include a transflective LCD display device that incorporates quantum rods as the specific nanorods aligned using said block copolymer material, although comparable principles and alignment methods may be applied to other configurations of nanoparticles, such as for example plasmonic nanorods. The display device may be an LCD display that incorporates an unpatterned aligned quantum rod layer that emits light essentially of a uniform wavelength (or at least a relatively narrow wavelength range corresponding to a single color), or the display device may incorporate a patterned aligned quantum rod layer that can emit light of multiple wavelengths corresponding to different colors, such as for example red, green, and blue.

An aspect of the invention is a quantum rod (or other suitable nanorod) display in which enhanced alignment of the quantum rods is achieved by employing an aligned block copolymer material to align the quantum rods. The display device may be a transflective display device. In exemplary embodiments, a display includes a liquid crystal layer and a quantum rod structure optically coupled to the liquid crystal layer. The quantum rod structure includes an aligned block copolymer material including a first polymer strain and a second polymer strain that are aligned relative to each other, and quantum rods that are embedded within either the first polymer strain or the second polymer strain, and the quantum rods are aligned by the alignment of the polymer strain in which the quantum rods are embedded. The quantum rod structure may be unpatterned whereby the quantum rod structure emits light of a single color or a combined color emission (e.g., white light), or patterned into regions whereby at least two of the regions include quantum rods that emit light of different colors (e.g., red, green, and blue regions). The quantum rods may include a functionalization ligand that renders the quantum rods preferentially soluble into the polymer strain in which the quantum rods are aligned.

The display further may include a front polarizer on a viewing side of the liquid crystal layer and the quantum rod structure, and a rear polarizer on a non-viewing side of the liquid crystal layer and the quantum rod structure. The display further may include a first alignment layer on a non-viewing side of the liquid crystal layer and a second alignment layer on a viewing side of the liquid crystal layer, wherein the first and second alignment layers align the liquid crystal layer. The transmission axes of the front and rear polarizers, the emission axis of the quantum rod structure, and the alignment directions of the liquid crystal alignment layers may be configured for the display device to operate in a twisted nematic (TN) mode, a fringe field switching (FFS) mode or a vertically aligned (VA) switching mode or other LCD switching modes.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIGS. 3A and 3B are drawings depicting different viewpoints of a first configuration of a columnar block copolymer phase.

FIGS. 4A and 4B are drawings depicting different viewpoints of a second configuration of a columnar block copolymer phase.

FIGS. 5A and 5B are drawings depicting different viewpoints of a first configuration of a laminar block copolymer phase.

FIGS. 10A and 10B are drawings depicting different viewpoints of a first configuration of aligned nanorods using the columnar block copolymer phase of FIGS. 3A and 3B.

FIGS. 11A and 11B are drawings depicting different viewpoints of a second configuration of aligned nanorods using the columnar block copolymer phase of FIGS. 4A and 4B.

FIGS. 12A and 12B are drawings depicting different viewpoints of a third configuration of aligned nanorods using the laminar block copolymer phase of FIGS. 5A and 5B.

FIGS. 13A and 13B are drawings depicting different viewpoints of a fourth configuration of aligned nanorods, also using the laminar block copolymer phase of FIGS. 5A and 5B.

FIG. 15 is a drawing depicting an exemplary LCD device that incorporates a quantum rod structure aligned by a block copolymer, in accordance with embodiments of the present application.

FIGS. 16A and 16B are drawings depicting another exemplary LCD device that incorporates a quantum rod structure aligned by a block copolymer, in accordance with embodiments of the present application.

FIGS. 17A and 17B are drawings depicting first variations of the layer structure of the LCD device.

FIGS. 18A and 18B are drawings depicting second variations of the layer structure of the LCD device.

FIGS. 19A and 19B are drawings depicting third variations of the layer structure of the LCD device.

FIG. 20 is a drawing depicting a fourth variation of the layer structure of the LCD device.

FIG. 21 is a drawing depicting an exemplary quantum rod layer structure aligned by a block copolymer, in accordance with embodiments of the present application.

FIGS. 22A, 22B, 22C, 22D, 22E, 22F, 22G, 22H, and 22I are drawings depicting additional exemplary embodiments of a quantum rod layer structure that incorporate a quantum rod block copolymer layer deposited on a substrate layer, in accordance with embodiments of the present application.

FIG. 23 is a drawing depicting another exemplary quantum rod layer structure aligned by a block copolymer for use in an out of cell configuration, in accordance with embodiments of the present application.

FIGS. 24A and 24B are drawings depicting exemplary LCD configurations that include a quantum rod block copolymer layer, and having the layers arranged in a twisted nematic (TN) mode configuration.

FIGS. 25A, 25B, 25C, and 25D are drawings depicting LCD configurations that includes a quantum rod block copolymer layer, and having the layers arranged in a fringe field switching (FFS) mode configuration.

DESCRIPTION OF EMBODIMENTS

Figure 1B:
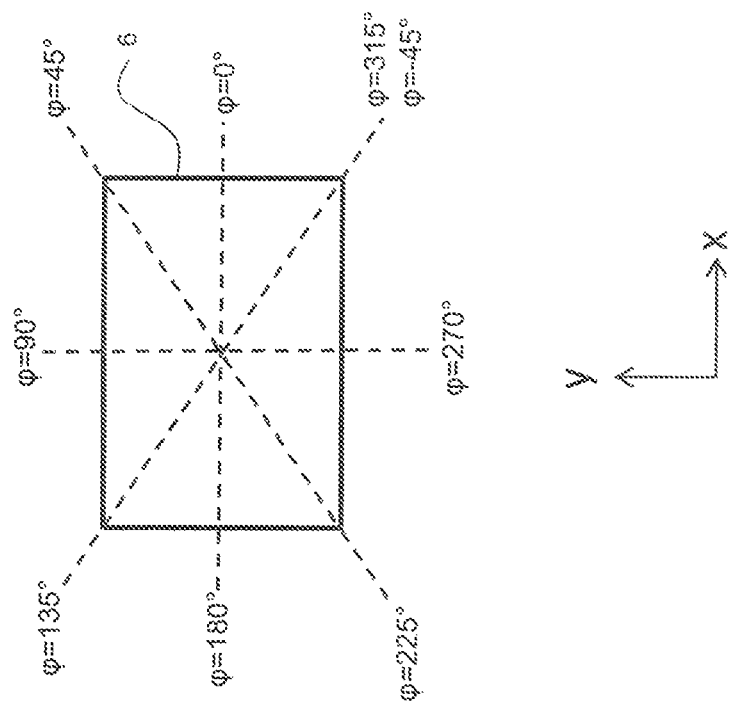
FIG. 1B defines a coordinate system pertaining to the in-plane angle φ identified in FIG. 1.

Embodiments of the present invention will now be described with reference to the drawings, wherein like reference numerals are used to refer to like elements throughout. It will be understood that the figures are not necessarily to scale.

Figure 1A:
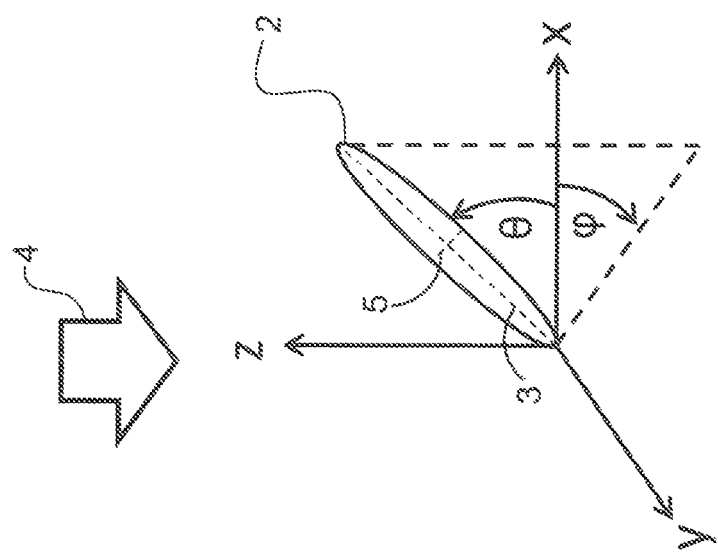
FIG. 1A defines a coordinate system for illustrating pertinent terms of orientation used in this disclosure.

For illustrative purposes, FIG. 1A defines a coordinate system for illustrating pertinent terms of orientation used in this disclosure. The axes x, y and z are orthogonal to each other. The angle between the x-axis and the y-axis is defined as the in-plane angle φ, with the term in-plane more particularly referring to being parallel to the plane of an LCD device. The angle between the x-axis (or y-axis) and the z-axis is the out-of-plane angle θ relative to the plane of an LCD device. For reference, an illustrative nanorod molecule 2 such as a quantum rod is depicted as may be oriented within a layer, and a viewing direction 4 of a viewer along the z-axis is also shown. The molecule 2 may be characterized by a long axis 3 and a short axis 5. FIG. 1B defines a related coordinate system pertaining to the in-plane angle φ identified in FIG. 1A. In particular, FIG. 1B shows a range of positioning of the in-plane angle φ with respect to an LCD device from the perspective of a viewing position relative to a generalized LCD device 6.

Some nanorods are emissive such as quantum rods. Quantum rods discussed herein may be represented by the object 2. Whereas quantum dots are approximately spherical in shape, quantum rods are approximately elliptical or cylindrical in shape as illustrated in FIG. 1A. A quantum rod may be characterized by an aspect ratio determined by dividing the long axis 3 by the short axis 5. In some embodiments, quantum rods described herein may have an aspect ratio>1.5. In additional embodiments, quantum rods described herein may have an aspect ratio>2. Furthermore, for a given wavelength of light, the radius of a quantum dot may be less than the Bohr radius whereas the length, e.g., long axis 3, of a quantum rod may be greater than the Bohr radius (the cross-section of the quantum rod, e.g., short axis 5, is also less than the Bohr radius). Because the length of the quantum rod is greater than the Bohr radius, the quantum rod layer may emit light that is at least partially polarized if one or more quantum rods in an aligned quantum rod layer is optically stimulated. In contrast, if a quantum dot is optically stimulated, the quantum dot may emit light that is substantially unpolarized. The advantage of quantum rods over quantum dots for all embodiments described herein is that light emitted by a quantum rod is more polarized (i.e., has a greater degree of polarization) than light emitted by a quantum dot.

Consequently, the quantum rod transflective display devices described herein may be more efficient (i.e. have lower power consumption) than quantum dot transflective display devices. The degree of polarization, V, of light is defined by V=IA/(IA+IB) where IA is the intensity of polarized light and IB is the intensity of unpolarized light. The degree of polarization for perfectly polarized light is V=1 and the degree of polarization for perfectly unpolarized light is V=0. The degree of polarization for light, V, emitted at room temperature from an aligned quantum rod layer such as in the embodiments described herein may be greater than 0.3. In some embodiments, the degree of polarization for light, V, emitted at room temperature from an aligned quantum rod layer such as the embodiments described herein may be greater than 0.5.

The embodiments described herein emit light from an aligned quantum rod layer with a degree of polarization, V, closer to 1 to enable more efficient (e.g., lower power consumption) quantum rod transflective display devices with brighter images. A quantum rod transflective display may demonstrate commercial advantage with regard to lower power consumption and brighter images provided that the emission of light from an aligned quantum rod layer has a degree of polarization that is >0.3, and preferably >0.5.

Additionally, a quantum rod transflective display may demonstrate commercial advantage with regard to lower power consumption and brighter images provided that the polarized component of light emitted from the aligned quantum rod layer has an ellipticity of less than 0.7, where the ellipticity is defined by a ratio b/a where "b" is the intensity of the minor elliptical axis and "a" is the intensity of the major elliptical axis. The major axis may be substantially parallel (i.e. within ±15°) to the long axis 3 of the quantum rod depicted in FIG. 1A. For diagrammatic and descriptive convenience, the embodiments described herein show that the emission of light from an aligned quantum rod layer has a degree of polarization of 1 (i.e., perfectly polarized) and is linearly polarized with the major polarization axis aligned parallel to the long axis of the quantum rod.

Although principles of the present application are described mainly in connection with quantum rods, comparable principles may apply to other suitable nanoparticles that may be aligned in an enhanced manner using the principles of the current application. As referenced above, as to "nano" particles and nanorods described herein, the nano prefix indicates that the particle has dimensions of the order of 1-100 nm. The term nanoparticle can refer to any particle having dimensions in this range, such as nanorods, plasmonic nanorods, nanospheres, or nano-disks for example. The "rod" suffix indicates that the nanoparticle is anisotropic with one directional axis being substantially longer than the other axes, as illustrated in FIG. 1A.

In accordance with embodiments of the present application, a method of aligning nanorod materials using block copolymer films is described. Alignment is performed by functionalizing the nanoparticle in such a manner as to encourage preferential diffusion into one of the two polymer material components of a Di-block copolymer. The nanorod is then aligned by space limitations of the associated polymer material within the block copolymer phase or material. The functionalization of the nanoparticle refers to the addition of chemicals that are chemically bonded to the surface of the nanorod to achieve preferential diffusion into one of the block copolymer components. The bonding of the functionalization chemical may be covalent, ionic, or be an intermediate bond. The functionalization chemical may be a ligand component of a quantum rod or other nanorod nanoparticle.

Figure 2:
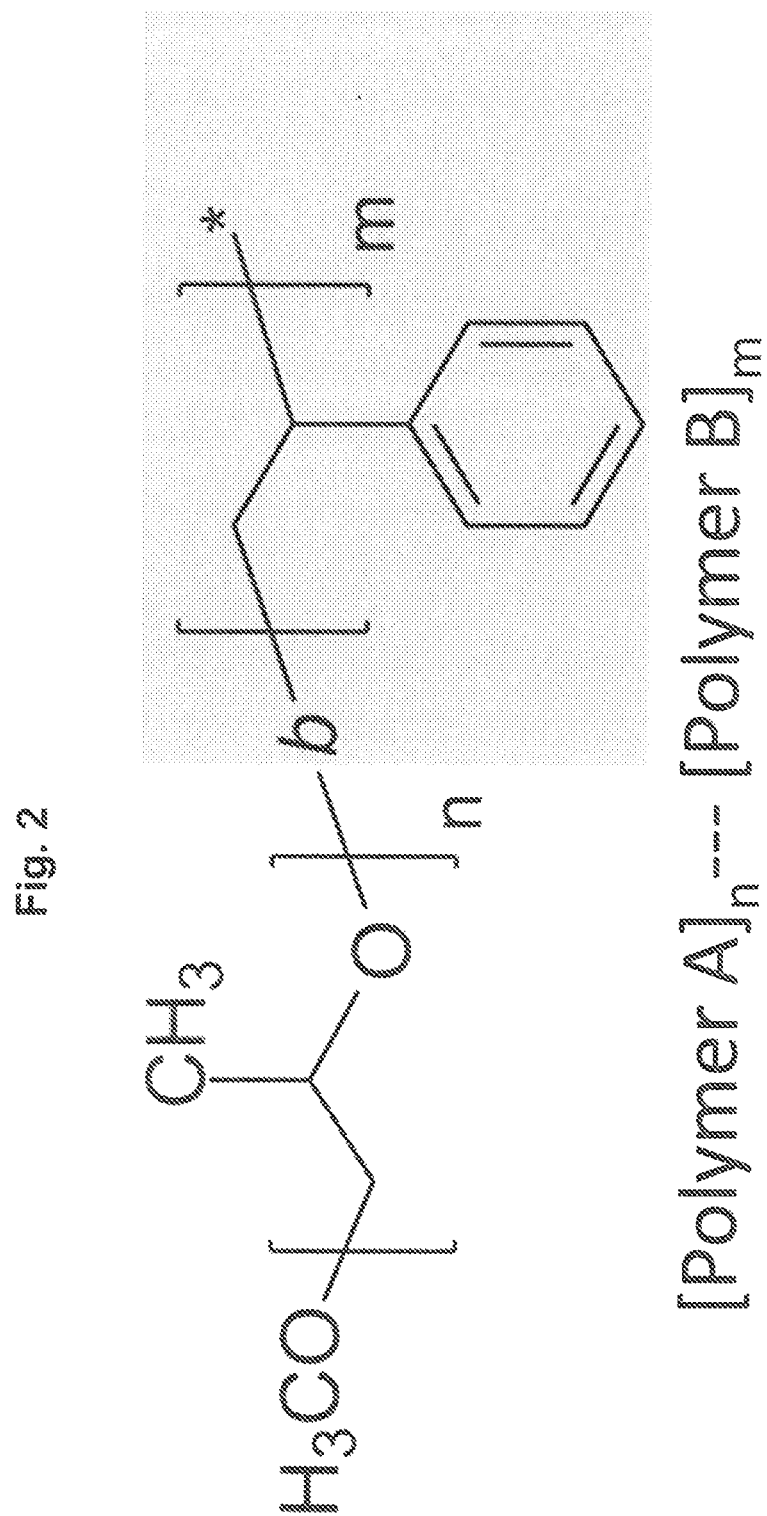
FIG. 2 depicts the chemical formula of a representative block copolymer molecule.

The following provides a general discussion of block copolymer materials. FIG. 2 depicts the chemical formula of a representative block copolymer molecule. A block copolymer (specifically di-block copolymer) is a material wherein a single polymer molecule is made of two substantially different polymer components or strains that are covalently bonded. In this diagram, the two polymer strains respectively are referred to as polymer A and polymer B with polymer B being highlighted in grey. An explanation of different phases potentially formed using a block copolymer is provided in https://doi.org/10.1063/1.882522. Such reference gives an illustrative explanation of the phases formed by a block copolymer as well as a plot showing the relationship between block copolymer phases and the polymer volume ratio ($f_A$) and repulsion factor ($\chi^N$). Of specific interest for embodiments of the present application is a laminar phase in which the two polymer strains or components form distinct layers in a block configuration. A laminar phase broadly may form corresponding to $\chi^N>0.1$ and $0.35>f_A>0.65$, and columnar phases which also have a layered configuration broadly may form when $\chi^N>0.1$ and $0.35 > f_A > 0.15$ or $0.85 > f_A > 0.65$. Columnar block copolymer phases are particularly suitable for use in embodiments of the current application.

Different configurations of a columnar block copolymer phase may be formed. FIGS. 3A and 3B are drawings depicting different viewpoints of a first configuration of a columnar block copolymer phase 10. In this example, the block copolymer material is deposited on a substrate 12. The block copolymer material includes a first polymer strain 14 and a second polymer strain 16. FIGS. 3A and 3B illustrate an example in which columns of the first polymer strain 14 are embedded within the second polymer strain 16, and the columns 14 are aligned in the plane of the substrate 12 with the substrate 12 oriented in the x-y plane. FIG. 3A shows the block copolymer from the point of view of the positive y-axis, and FIG. 3B shows the block copolymer from the point of view of the positive z-axis. Formation of such a block copolymer configuration may have a variety of uses, such as for example in nano-plating to make very fine wires on a chip. Referring back to FIG. 2, if m>n then polymer A of FIG. 2 corresponds to the columns and polymer B corresponds to the surrounding material, and if n>m then polymer B of FIG. 2 corresponds to the columns and polymer A corresponds to the surrounding material.

FIGS. 4A and 4B are drawings depicting different viewpoints of a second configuration of a columnar block copolymer phase 10a. In this example, the block copolymer material again is deposited on a substrate 12, and the block copolymer material includes a first polymer strain 14 and a second polymer strain 16. FIGS. 4A and 4B illustrate an example in which columns of the first polymer strain 14 are embedded within the second polymer strain 16 (similarly as in the previous configuration), and the columns 14 are aligned out of the plane of the substrate 12 with the substrate oriented in the x-y plane. FIG. 4A shows the block copolymer from the point of view of the positive y-axis, and FIG. 4B shows the block copolymer from the point of view of the positive z-axis.

FIGS. 5A and 5B are drawings depicting different viewpoints of a first configuration of a laminar block copolymer phase 10b. In this example, the block copolymer material again is deposited on a substrate 12, and the block copolymer material includes a first polymer strain 14 and a second polymer strain 16. FIGS. 5A and 5B illustrate an example in which lamellae of the first polymer strain 14 are embedded within the second polymer strain 16 (similarly as in the previous configuration), and the columns 14 are aligned in the y-direction with the substrate oriented in the x-y plane. FIG. 5A shows the block copolymer from the point of view of the positive y-axis, and FIG. 5B shows the block copolymer from the point of view of the positive z-axis.

Figure 6:
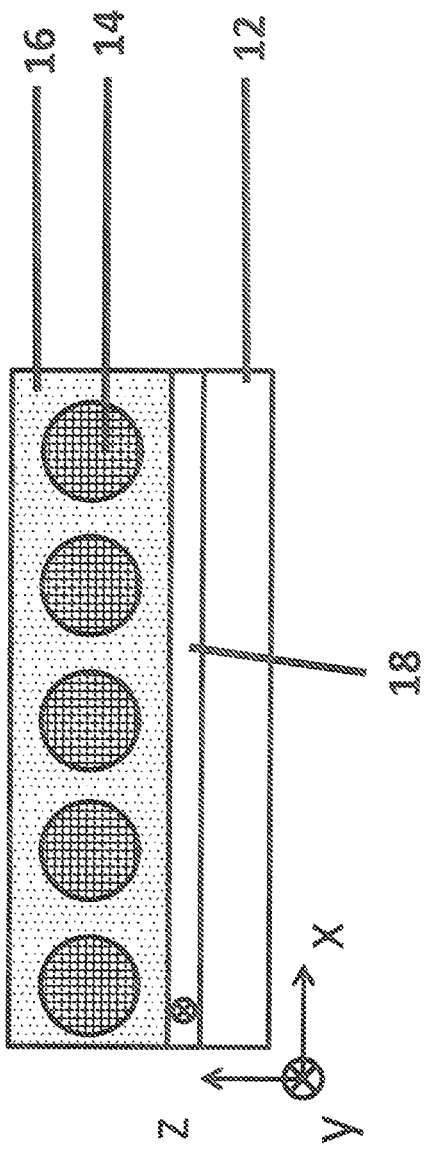
FIG. 6 is a drawing depicting a first method of inducing alignment of columns of a block copolymer material, in connection with the resultant alignment as illustrated in FIGS. 3A and 3B.

The columns of the block copolymer material may be aligned using a variety of methods. FIG. 6 is a drawing depicting a first method of inducing alignment of columns of a block copolymer material, which results in the configuration shown in FIG. 3A. In this example, global alignment of block copolymer columns 14 is performed by the depositing of an alignment layer 18 upon the substrate 12. The alignment layer 18 operates to induce a preferential alignment direction in the block copolymer to align the columns 14 in a desired direction. Such an alignment layer 18 may be a rubbed or photo aligned polyimide material. With this method of alignment, it may be particularly suitable to use a block copolymer polymer strain 16 that has elements of similar molecular structure to liquid crystals. Such a method is described in (Roberts et al https://doi.org/10.1117/1.JNP.8.083091).

Figure 7:
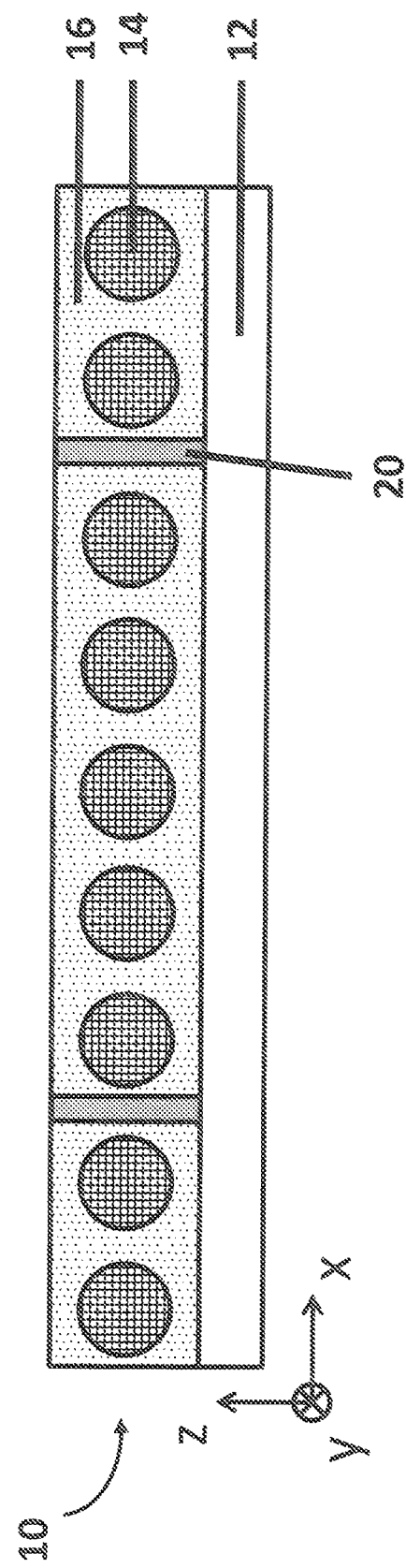
FIG. 7 is a drawing depicting a second method of inducing alignment of columns of a block copolymer material, in connection with the resultant alignment as illustrated in FIGS. 3A and 3B.

FIG. 7 is a drawing depicting a second method of inducing alignment of columns of a block copolymer material, which also results in the configuration shown in FIG. 3A. In this example, global alignment of block copolymer columns 14 is performed by forming alignment structures 20 on the substrate 12 prior to the deposition of the block copolymer. The structural or physical configuration of the alignment structures 20 operates to induce alignment of the columns 14 when the block copolymer material subsequently is deposited on the substrate 12 about the alignment structures 20. Such a method is described in (Kim et al https://apps.dtic.mil/dtic/tr/fulltext/u2/a525838.pdf).

Figure 8:
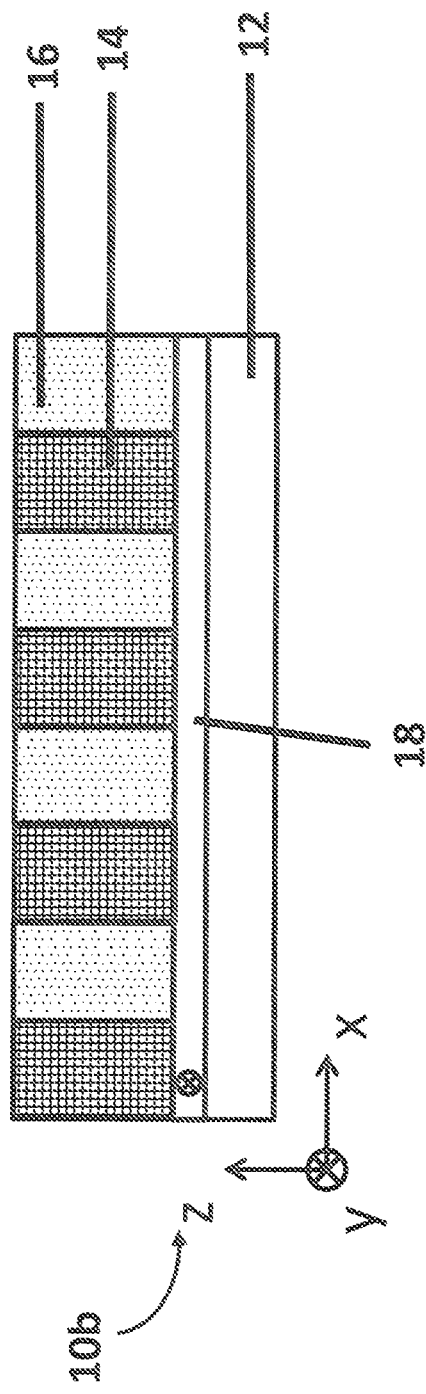
FIG. 8 is a drawing depicting the first method of inducing alignment of lamellae of a block copolymer material, in connection with the resultant alignment as illustrated in FIGS. 5A and 5B.
Figure 9:
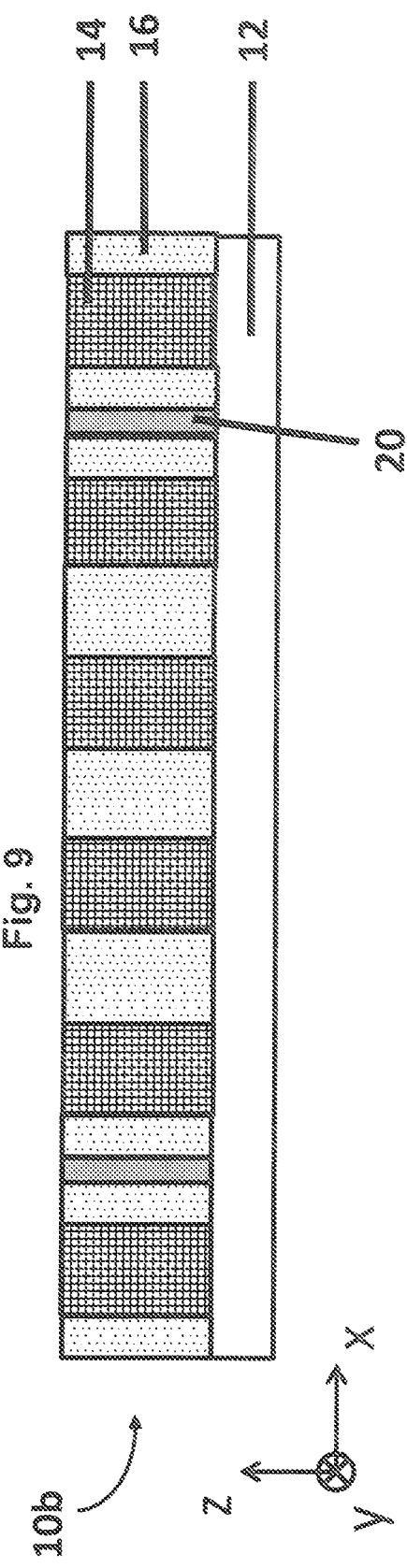
FIG. 9 is a drawing depicting the second method of inducing alignment of lamellae of a block copolymer material, in connection with the resultant alignment as illustrated in FIGS. 5A and 5B.

The examples of FIGS. 6 and 7 illustrate alignment of columns in connection with the resultant alignment illustrated in FIGS. 3A and 3B. Comparable alignment methods may be applied to other alignment configurations. For example, FIG. 8 is a drawing depicting the first method of inducing alignment of lamellae of a block copolymer material using the alignment layer 18, in connection with the alignment of columns along the y-direction as illustrated in FIGS. 5A and 5B. Similarly, FIG. 9 is a drawing depicting the second method of inducing alignment of lamellae of a block copolymer material using the alignment structures 20, also in connection with the alignment of columns along the y-direction as illustrated in FIGS. 5A and 5B. Comparable methods may be used to form other suitable configurations of aligned blocked copolymer.

The described configurations of aligned block copolymer material may be used to align nanorods commensurately with the alignment of the columns of the block copolymer materials. Generally, as referenced above, alignment is performed by functionalizing the nanorods (or other nanoparticles) in such a manner as to encourage preferential diffusion into one of the two polymer material strains of a block copolymer material. The nanorod is then aligned by spatial limitations of the associated polymer strain within the block copolymer phase or material. In particular, the columns/lamellae formed, for example by the polymer strain 14, constrain the nanorods embedded therein to align along the column orientation.

As illustrative of nanorod alignment, FIGS. 10A and 10B are drawings depicting different viewpoints of a first configuration of aligned nanorods using the columnar block copolymer phase 10 of FIGS. 3A and 3B, in which the columns and nanorods are aligned in the plane of the substrate 12 with the substrate 12 oriented in the x-y plane. As seen in such figures, nanorods 22 are aligned along the columns 14 of the block copolymer material. FIG. 10A shows the block copolymer with the aligned nanorods from the point of view of the positive y-axis, and FIG. 10B shows the block copolymer from the point of view of the positive z-axis. The alignment of the nanorods 22 by operation of alignment of the columns 14 can be achieved by functionalizing the nanorods 22 in a manner that they are preferentially soluble within the first polymer material 14 that forms the columns over the second polymer material 16. Such functionalization is described in more detail below.

Such principles are equally applicable to aligning nanorods using other block copolymer configurations. For example, FIGS. 11A and 11B are drawings depicting different viewpoints of a second configuration of aligned nanorods 22 within the columns 14 using the columnar block copolymer phase 10a of FIGS. 4A and 4B, in which the columns and nanorods are aligned out of the plane of the substrate 12 with the substrate 12 oriented in the x-y plane.

FIGS. 12A and 12B are drawings depicting different viewpoints of a first configuration of aligned nanorods 22 within the lamellae 14 using the laminar block copolymer phase 10b of FIGS. 5A and 5B, in which the columns and nanorods are aligned in the y-direction with the substrate 12 oriented in the x-y plane.

FIGS. 13A and 13B are drawings depicting different viewpoints of a second configuration of aligned nanorods, also using the laminar block copolymer phase of FIGS. 5A and 5B. In this example, different types of nanorods are aligned by the lamellae of polymer material oriented in the y-direction, with the substrate 12 again being oriented in the x-y plane. In this example, the alignment of first nanorods 24 in the first polymer strain material 14, and the alignment of second nanorods 26 in the second polymer strain material 16, can be achieved by selectively functionalizing the nanorods 24 and 26 in a manner that each category or type of nanorod is preferentially soluble respectively within the corresponding polymer strain material 14 or 16 that forms the lamellae over the other of the polymer strain material. Again, such functionalization is described in more detail below.

Figure 14A:
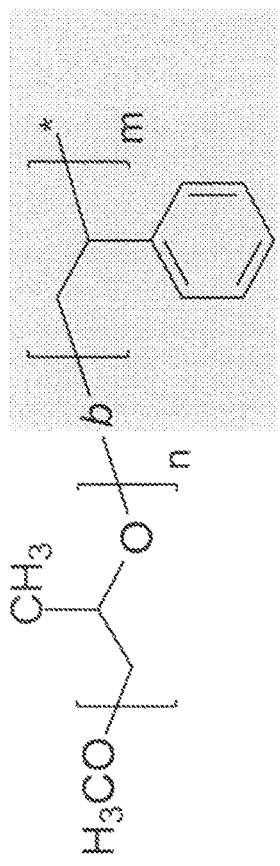
FIG. 14A depicts the chemical structure of a representative block copolymer material comparably as illustrated in FIG. 2.
Figure 14B:
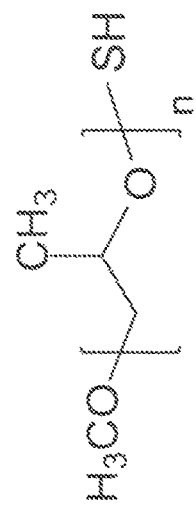
FIG. 14B depicts a first exemplary chemical structure of a ligand that may be used to functionalize a nanorod to enable selective diffusion into a particular component polymer material of a block copolymer configuration.
Figure 14C:
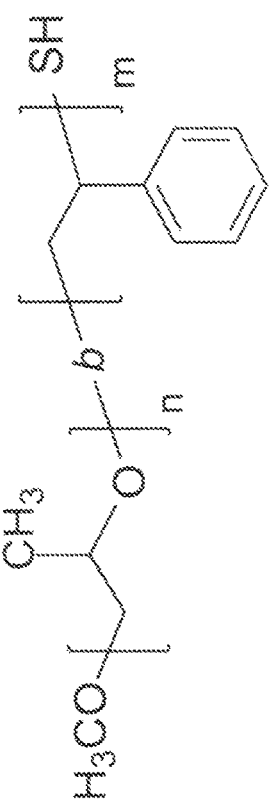
FIG. 14C depicts a second exemplary chemical structure of a ligand that may be used to functionalize a nanorod to enable selective diffusion into a particular component polymer material a block copolymer configuration.

As referenced above, the functionalization of a nanorod (or other nanoparticle) refers to the addition of chemicals that are chemically bonded to the surface of the nanorod to achieve preferential diffusion into one of the block copolymer strains. The bonding of the functionalization chemical may be covalent, ionic, or be an intermediate bond. The functionalization chemical may be a ligand component of a quantum rod or other nanorod nanoparticle. FIG. 14A depicts the chemical structure of a representative block copolymer material comparably as illustrated in FIG. 2. A nanorod element may be functionalized by including a ligand that is incorporated as part of the nanorod structure, which renders the nanorod selectively soluble within a particular copolymer material that part of a block copolymer configuration. For example, FIG. 14B depicts a first exemplary chemical structure of a ligand that may be used to functionalize a nanorod to enable selective diffusion into a particular component polymer strain of a block copolymer configuration. FIG. 14C depicts a second exemplary chemical structure of a ligand that may be used to functionalize a nanorod to enable selective diffusion into a particular component polymer strain of a block copolymer configuration. For instance, if the block co polymer were a PEG-PS (Polyethylene glycol-polystyrene) di-block co-polymer, then the nanorod ligands may be have a PEG terminal group to facilitate diffusion into the PEG region of the block copolymer structure (see FIG. 14B). Alternatively, the nanorods may be functionalized with a ligand with a PS terminal group to facilitate diffusion into the PS region of the block copolymer structure. Alternatively, the nanorods may be functionalized with a ligand with a chemical structure similar to the block co-polymer, such as in the case illustrated in FIG. 14C, and the ligand would facilitate diffusion into the PS region of the block copolymer structure.

An aspect of the invention is a quantum rod (or other nanorod) display in which enhanced alignment of the quantum rods (or other nanorods) is achieved by employing an aligned block copolymer material to align the quantum rods. The display may be a transflective display. In exemplary embodiments, a display includes a liquid crystal layer and a quantum rod structure optically coupled to the liquid crystal layer. The quantum rod structure includes an aligned block copolymer material including a first polymer strain and a second polymer strain that are aligned relative to each other, and quantum rods that are embedded within either the first polymer strain or the second polymer strain, and the quantum rods are aligned by the alignment of the polymer strain in which the quantum rods are embedded. The quantum rod structure may be unpatterned whereby the quantum rod structure emits light of a single color, or the unpatterned quantum rod structure may contain multiple different types of quantum rods with different emission wavelengths whereby the combined emission may be a combination of two or more colors such as two or more of red, green, or blue colors (e.g., white light). The quantum rod structure alternatively may be patterned into regions whereby at least two of the regions include quantum rods that emit light of different colors (e.g., red, green, and blue regions). The quantum rods may include a functionalization ligand that renders the quantum rods preferentially soluble into the polymer strain in which the quantum rods are aligned.

FIG. 15 is a drawing depicting an exemplary transflective LCD display device 30 that incorporates a quantum rod structure including quantum rods aligned by a block copolymer, in accordance with embodiments of the present application. The viewing direction of the LCD device 30 is indicated by the arrow 32. The LCD device 30 includes a backlight 34 that emits light to a quantum rod structure 36, which in turn is optically coupled to a liquid crystal layer 38. In this example, the quantum rod structure is an unpatterned structure that emits light at essentially a uniform wavelength, or at least a relatively narrow wavelength range corresponding to a single color. The unpatterned quantum rod structure alternatively may contain multiple different types of quantum rods with different emission wavelengths, whereby the combined emission may be a combination of two or more colors such as two or more of red, green, or blue colors, and in one example a combination of red/green/blue corresponding to white light. With such emission, the quantum rod structure may act as a quantum dot enhancement film (QDEF).

The unpatterned quantum rod structure 36 may include a rear (non-viewing side) film 40, a quantum rod block copolymer layer 42, and a front (viewing side) film 44. The quantum rod block copolymer layer 42 may be configured, for example, in accordance with any of the embodiments of FIGS. 10-13. The front and rear films may incorporate any suitable enhancement layers to improve performance of the LCD device. For example, the rear film 40 may include one or more of the following layer structures as are known in the art: a dual brightness enhancement film (DBEF), a polarizer film, a support film, and an alignment layer. Similarly for example, the front film 44 may include one or more of the following layers as are known in the art: a DBEF, a polarizer film, a support film, and an alignment layer. In an exemplary embodiment, the front film 44 may be absent. The liquid crystal layer 38 may be a fringe field switching (FFS) type liquid crystal layer, a twisted nematic (TN) type liquid crystal device, or any other suitable type of liquid crystal device.

FIG. 16A is a drawing depicting another exemplary LCD display device 50 that incorporates an unpatterned quantum rod structure aligned by a block copolymer, in accordance with embodiments of the present application. FIG. 16A depicts a more detailed layer structure illustrating components that are referenced more generally above in connection with FIG. 15. Generally, in this embodiment, an in-cell unpatterned quantum rod layer aligned by a block copolymer is positioned on the viewing side of the liquid crystal layer. The viewing direction of the LCD device 50 is indicated by the arrow 52. In this example, the LCD device 50 includes from the non-viewing side: a backlight unit 54; a backlight side polarizer 56; a backlight side substrate 58; a backlight side alignment layer 60; a liquid crystal layer 62;

a viewing side alignment layer 64; an unpatterned aligned quantum rod block copolymer layer 66; a viewing side substrate 68; and a viewing side polarizer 70. Similarly as in the previous embodiment of the LCD device 30, the unpatterned aligned quantum rod block copolymer layer 66 may be configured according to any of the embodiments of FIGS. 10-13, and as an unpatterned layer essentially is configured to emit light of a single color, or as referenced above a combined color emission that may be white light. Additional details of the aligned quantum rod block copolymer layer 66 are described in connection with subsequent figures below.

The backlight unit 54 may be a collimated type backlight or a conventional type backlight. The backlight unit 54 may be a white type backlight or a non-white type backlight, and in particular may include blue light wavelengths and/or near UV wavelengths within the range of 350 to 480 nm, and/or UV wavelengths within the range 300 to 380 nm. The backlight unit 54 may incorporate any suitable components as are known in art for improving performance as to any particular application, including for example beam steering optics, brightness enhancement films, polarization optics such as polarizer films, DBEFs, or view angle control optics such as diffractive layers or louver films. The backlight side polarizer 56 may be a linear polarizer, a circular type polarizer, a reflective type polarizer or a combination thereof, and further may incorporate optical compensation films such as a negative C-plate retarder. The backlight side substrate 58 may include one or more electrode layers (which may be segmented electrode layers), TFT electronics, black mask, and/or photo spacers.

The backlight side alignment layer 60 may be a rubbed type alignment layer or a photo alignment type alignment layer that induces alignment in the adjacent liquid crystal layer 62, and further may be configured to have polarization properties similar to an in-cell polarizer. Alternatively, the backlight side alignment layer 60 may be an in-cell polarizer that also is configured to have additional functionality of aligning the liquid crystal layer 62. An advantage of a single layer that has both an optical linear polarizer function and an LC alignment layer function is reduced manufacturing cost and/or reduced thickness and/or reduced voltage operation for the LC layer. The viewing side alignment layer 64 also may be a rubbed type alignment layer or a photo alignment type alignment layer that induces alignment in the adjacent liquid crystal layer 62, and may be configured to have polarization properties similar to an in-cell polarizer. Alternatively, the viewing side alignment layer 64 may be an in-cell polarizer that also is configured to have additional functionality of aligning the liquid crystal layer 62. Again, an advantage of a single layer that has both an optical linear polarizer function and an LC alignment layer function may be reduced manufacturing cost and/or reduced thickness and/or reduced voltage operation for the LC layer. The liquid crystal layer 62, alignment layers 60 and 64, and electrode structures that may be incorporated into the substrates 58 and 68, may be arranged in a manner similar or identical to a fringe field switching type switching mode, an in-plane switching type switching mode, a twisted nematic type switching mode, a super twisted type switching mode, or any other suitable LC type switching mode for a given application.

The viewing side substrate 68 may include one or more of the following layers as are known in the art: a color filter layer, one or more electrode layers, TFT electronics, black mask, and/or photo spacers. The viewing side polarizer 70 may be a linear polarizer, a circular type polarizer, a reflective type polarizer or a combination thereof, and further may incorporate optical compensation films such as for example a negative C-plate retarder.

FIG. 16B depicts a variation 50a on the embodiment of FIG. 16A in which the unpatterned quantum rod block copolymer layer 66 is configured further to function as an in-cell polarizer. With such polarization functionality, the additional front side polarizer 70 may be rendered unnecessary, which has an advantage of reducing the number of layers. In this example, the polarizing quantum rod block copolymer layer 66 is depicted as being on the non-viewing side of the substrate 68, and in an alternative embodiment the polarizing quantum rod block copolymer layer 66 is located on the viewing side of the substrate 68.

FIGS. 17-20 are drawings depicting LCD display devices that are variations on the embodiment of the LCD display device 50/50a of FIGS. 16A and 16B. Accordingly, like reference numerals are used to refer to like components in FIG. 17-20 as in FIGS. 16A/16B, and the following description principally is directed to the features that constitute variations on the above. Layers common to multiple embodiments may be configured comparably as described above. Specifically, FIGS. 17A, 17B, 18A, and 18B illustrate a device that has a transflective configuration based on the positioning of the quantum rod layer.

In the example 50b of FIG. 17A, an in-cell unpatterned quantum rod layer aligned by block copolymer 66 is provided, and in this configuration such layer is located on the on the backlight side of the liquid crystal layer 62. In particular, the unpatterned aligned quantum rod block copolymer layer 66 is provided between the backlight side substrate 58 and the backlight side alignment layer 60 in the depicted example. As another variation, the aligned quantum rod block copolymer layer 66 may be incorporated into the backlight side substrate 58, and with such configuration the backlight side substrate 58 also may incorporate a color filter layer so long as the color filter is on the viewing side of the quantum rod block copolymer layer 66.

FIG. 17B depicts a variation 50c on the embodiment of FIG. 17A, in which the quantum rod block copolymer layer 66 also has properties that provide a liquid crystal alignment function. The surface of the quantum rod layer 66 may be configured as a rubbed type alignment layer or a photo alignment type alignment layer that induces alignment in the adjacent liquid crystal layer 62. In this embodiment, the quantum rod block copolymer layer 66 thus operates to align the liquid crystal layer 62, and thus a separate backlight side alignment layer 60 is not necessary. Such a configuration has an advantage of reducing the number of layers in the stack. A comparable variation is applicable to subsequent embodiments in which the quantum rod block copolymer layer is positioned to permit alignment of the liquid crystal layer.

In the example 50d of FIG. 18A, the location of the quantum rod block copolymer layer 66 is comparable as in the example of FIGS. 17A/17B (i.e., located on the non-viewing side of the liquid crystal layer 62). In the example of FIG. 18A, the quantum rod block copolymer layer 66 is patterned to include multiple color components or regions, which in this example are designated 66R (red), 66G (green), and 66B (blue). Accordingly, in this example the aligned quantum rod block copolymer layer 66 is patterned (in contrast to the unpatterned configuration of previous embodiments) into three separate regions, 66R, 66G, and 66B, each corresponding to red, green, and blue pixels respectively. In other words, layer 66R contains quantum rods with emission wavelengths in the red region of the optical spectrum, layer 66G contains quantum rods with emission wavelengths in the green region of the optical spectrum, and layer 66B contains quantum rods with emission wavelengths in the blue region of the optical spectrum. With such configuration, the quantum rod block copolymer layer 66 further may incorporate an in-cell polarizer. The area and/or height of two or more of quantum rod block copolymer regions 66R, 66G, and 66B may be identical or may be different. The ratio of quantum rods to polymer in two or more of regions 66R, 66G, and 66B also may be identical or different.

FIG. 18B depicts a variation 50e of the configuration of FIG. 18A, but in which there are no quantum rods within the previous blue emission, denoted as region 660 in FIG. 18B to indicate such lack of quantum rods. In this embodiment, there may be nanoparticles in region 660 that scatter all or a subsection of wavelengths of light emitted from the backlight 54, or the nanoparticles may be transparent to all or a subsection of wavelengths of light emitted from the backlight 54. A comparable variation is applicable to any of the embodiments that include patterning for different color regions, whereby one region, and in particular the blue region, instead may lack quantum rods and alternatively may include scattering or transparent nanoparticles. Specifically, the nanoparticles may scatter blue wavelengths or be transparent to blue wavelengths, absorbing at least a subset of other wavelengths.

In the example 50f of FIG. 19A, the layer stack configuration is comparable as in the embodiment of FIG. 16A, with the quantum rod block copolymer layer 66 positioned on the viewing side of the liquid crystal layer 62. In addition, in this example the quantum rod block copolymer layer 66 is red/green/blue (RGB) patterned (comparably as in the embodiment of FIG. 18A) to include multiple color components or regions, which in this example again are designated 66R (red), 66G (green), and 66B (blue). Accordingly, as in the embodiment of FIG. 18A, in this example of FIG. 19A the aligned quantum rod block copolymer layer 66 is patterned into three separate regions, 66R, 66G, and 66B, each corresponding to red, green, and blue pixels respectively. In other words, layer 66R contains quantum rods with emission wavelengths in the red region of the optical spectrum, layer 66G contains quantum rods with emission wavelengths in the green region of the optical spectrum, and layer 66B contains quantum rods with emission wavelengths in the blue region of the optical spectrum. As in the previous embodiment, the area and/or height of two or more of quantum rod block copolymer regions 66R, 66G, and 66B may be identical or may be different. The ratio of quantum rods to polymer in two or more of regions 66R, 66G, and 66B also may be identical or different. The blue quantum rod patterned region (66B) also may be replaced with a transparent or scattering layer 660, as described above with respect to FIG. 18B.

FIG. 19B depicts a variation 50g on the embodiment of FIG. 19A in which the RGB patterned quantum rod block copolymer layer 66 is configured further to function as an in-cell polarizer. With such polarization functionality, the additional front side polarizer 70 may be rendered unnecessary, which has an advantage of reducing the number of layers. In this example, the polarizing quantum rod block copolymer layer 66 is depicted as being on the non-viewing side of the substrate 68, and in an alternative embodiment the polarizing quantum rod block copolymer layer 66 may be located on the viewing side of the substrate 68. The blue quantum rod patterned region 66B also may be replaced with a transparent or scattering layer 660, as described above with respect to FIG. 18B.

In the example 50h of FIG. 20, the quantum rod block copolymer layer 66 also is positioned on the viewing side of the liquid crystal layer 62, and in this particular configuration the layer 66 is positioned between the viewing side substrate 68 and the viewing side polarizer 70. In addition, the quantum rod block copolymer layer 66 also is patterned comparably as in previous embodiments to include multiple color components or regions, which in this example again are designated 66R (red), 66G (green), and 66B (blue). The blue quantum rod patterned region 66B also may be replaced with a transparent or scattering layer 660, as described above with respect to FIG. 18B.

FIG. 21 is a drawing depicting an exemplary quantum rod structure 80 aligned by a block copolymer, in accordance with embodiments of the present application, including various sub-components of such structure. The quantum rod block copolymer layer 80 may be incorporated as the quantum rod block copolymer layer in previous embodiments of an LCD device. One or more of the sub-components may be omitted as may be warranted for any particular application. As depicted in the example of FIG. 21, the aligned quantum rod structure 80 includes the following layers or sub-components from the non-viewing side: a rear polarizer layer 82; a copolymer aligning layer 84; a quantum rod block copolymer layer 86; an encapsulation layer 88; and a front polarizer layer 90.

The rear polarizer layer 82 may be an in-cell type polarizer, and more specifically may be a lyotropic liquid crystal type in-cell polarizer, a wire grid in-cell polarizer, a thermotropic liquid crystal type guest host in-cell polarizer, or another suitable type of in-cell polarizer as may be warranted for a particular application. Respective arrows indicate transmission axes of the polarizers 82 and 90, and the emission axis of the quantum rod layer 86. The transmission axis of the polarizer 82 is parallel to the emission axis of the quantum rod block copolymer layer 86 and the transmission axis of the front polarizer 90, as indicated by the respective arrows shown in such blocks. The rear polarizer layer also may also act as the block copolymer aligning layer, in which case the additional copolymer aligning layer 84 may be omitted. The copolymer aligning layer 84 (or as may be part of the rear polarizer), may be a rubbed type alignment layer, a photo alignment type alignment layer, a micro-grating type alignment layer, or a nano-grating alignment layer. The copolymer aligning layer 84 operates to align the polymer strains of block copolymer material, as described above in connection with the alignment layers 18 shown in FIGS. 9 and 14. In an alternative embodiment, instead of said polymer aligning layer, alignment may be performed using alignment structures deposited on the rear polarizer, similar to the alignment structures 20 shown in FIGS. 10 and 15.

The quantum rod block copolymer layer 86 is a mixture of quantum rods and block copolymer material, and may be configured for example in accordance with any of the embodiments of FIGS. 10-13. The quantum rod block copolymer layer 86 may contain quantum rods with a single emission wavelength range, i.e. 500 nm-600 nm, or it may contain a mixture of quantum rods with multiple emission wavelength ranges. The block copolymer material may be bonded to the quantum rods, or the quantum rods may be enclosed in a matrix of block copolymer material. As referenced above, the emission axis of the quantum rod block copolymer layer 86 is indicated by the arrow in such block, and again such emission axis is parallel to the transmission axes of the polarizers 82 and 90.

The encapsulation layer 88 may be a polymer material or other organic material, or an inorganic/organic composite material. The encapsulation layer 88 may act as a secondary alignment layer specifically as to the copolymer material of the quantum rod layer 86, and thus the encapsulation layer 88 may be a rubbed type alignment layer, a photo alignment type alignment layer, a micro-grating type alignment layer, or a nano-grating alignment layer.

The front polarizer layer 90 may be an in-cell type polarizer, and more specifically may be a lyotropic liquid crystal type in-cell polarizer, a wire grid in-cell polarizer, a thermotropic liquid crystal guest host type in-cell polarizer, or another suitable type of in-cell polarizer as may be warranted for a particular application. As referenced above, the transmission axis of the polarizer 90 is parallel to the emission axis of the quantum rod block copolymer layer 86 and the transmission axis of the rear polarizer 82. The front polarizer layer 90 may also act as the encapsulation layer, in which case a separate encapsulation layer 88 may be omitted.

The copolymer aligning layer 84 may be omitted by employing a fabrication process in which the quantum rod block copolymer layer 86 is aligned on a disposable substrate during an intermediate step of the fabrication process. In such case, the quantum rod block copolymer layer 86 as pre-aligned is removed from the disposable substrate and transferred to the LCD device substrate. The polarizer elements also may be omitted due to the pre-alignment of the quantum rod block copolymer layer 86 having a polarized emission that renders additional polarizers unnecessary.

Figure 22E:
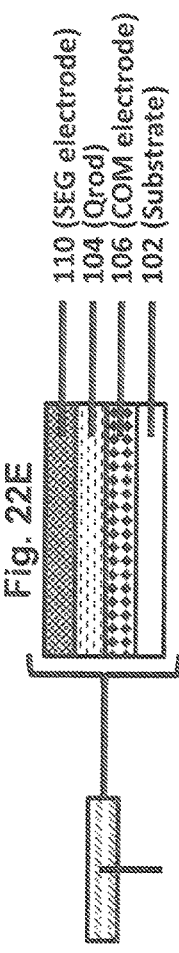
Figure 22F:
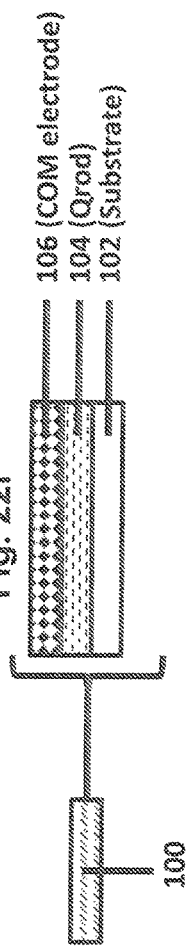
Figure 22G:
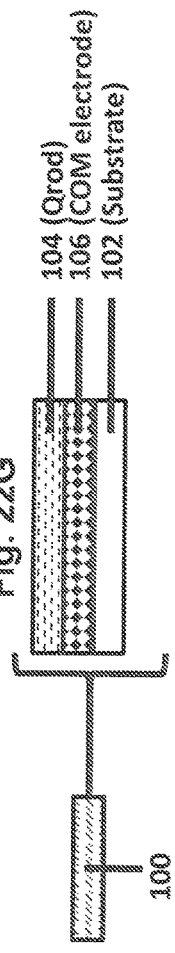
Figure 22H:
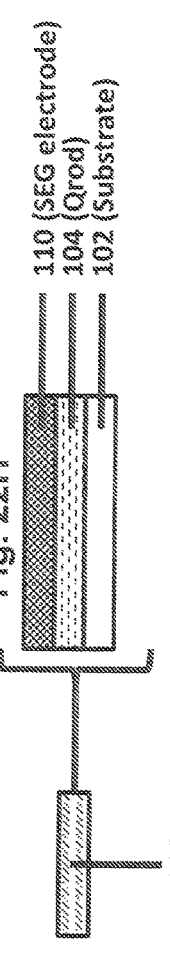
Figure 22I:
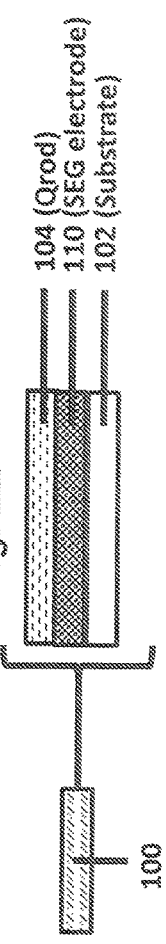

FIGS. 22A-22I are drawings depicting additional exemplary embodiments of a quantum rod layer structure 100 that incorporates a quantum rod block copolymer layer deposited on a substrate layer. Each figure depicts a variation of the layer ordering on the substrate, with the layers being denoted by the different shading and reference numerals. Generally, the layers of the quantum rod layer structure 100 may include a substrate 102 and a quantum rod block copolymer layer 104, and one or more of a common electrode layer 106, an insulator layer 108, and a segmented electrode layer 110. The embodiments of FIGS. 22A-22E depict a fringe field switching (FFS) type structure in which both the common electrode layer 106 and segmented electrode layer 110 are present. The embodiments of FIGS. 22F-22G depict a twisted nematic (TN) type structure in which only a single common electrode layer 106 is present on the viewing side of the substrate. The embodiments of FIGS. 22H-22I depict an in-plan switching (IPS) type structure in which only a single segmented electrode layer 110 is present on the substrate. The quantum rod block copolymer layer 104 is provided on a viewing side of the substrate 102, and the substrate 102 may be patterned in multiple color regions, such as red/green/blue regions.

FIG. 23 is a drawing depicting another exemplary quantum rod layer structure 112 aligned by a block copolymer for use in a LCD display with an out of cell quantum rode configuration similarly as in FIG. 15, in accordance with embodiments of the present application. In the depicted example of FIG. 23, the quantum rod layer structure 112 includes the following layers or sub-components from the non-viewing side: a first (non-viewing side) substrate layer 114; a rear polarizer layer 116; a first copolymer aligning and encapsulation layer 118; a quantum rod block copolymer layer 120; a second copolymer and encapsulation layer 122; a front polarizer layer 124; and a second (viewing side) substrate layer 126. Such layers may be composed comparably as analogous layers in the previous embodiments, and the various alignment, encapsulation, and polarizer layers may be omitted as warranted for any particular application, and in particular the substrate layer 114 may have polarization and/or alignment properties that render other components unnecessary.

The substrate layers 114 and 126 may have partial reflective properties in that one or both of the substrate layers may have transmission properties to allow some wavelengths of light to be transmitted while other wavelengths of light are reflected. Specifically, the substrate closest to the backlight may have optical properties such that the backlight wavelengths are not reflected while the wavelengths of light emitted by the quantum rods are reflected. This boosts the light output efficiency of the device by recycling light emitted from the quantum rods in the negative z-direction toward the non-viewing side. Furthermore, the substrate farthest from the backlight may have optical properties such that the backlight wavelengths are reflected while the wavelengths of light emitted by the quantum rods are not reflected. This further boosts the efficiency of the device by reflecting backlight light that has not undergone wavelength conversion by the quantum rods.

Similarly as the embodiment of FIG. 21 above, transmission axes of the polarizers and the emission axis of the quantum rod block copolymer layer are indicated by the arrows in such blocks. Again, the transmission axis of the front polarizer 124 is parallel to the emission axis of the quantum rod block copolymer layer 120 and the transmission axis of the rear polarizer 116. In addition, polymer aligning/encapsulation layers 118 and 122 may be omitted if the quantum rod block copolymer layer 120 is aligned on a disposable substrate during an intermediate step of a fabrication process. In such case, the quantum rod block copolymer layer 120 as pre-aligned is removed from the disposable substrate and transferred to the LCD device substrate. The polarizer elements also may be omitted due to the pre-alignment of the quantum rod block copolymer layer 120 having a polarized emission that renders additional polarizers unnecessary.

The described transflective LCD display devices may be configured to operate in a variety of emission modes. Generally, the transmission axes of the front and rear polarizers, the emission axis of the quantum rod structure, and the alignment directions of the liquid crystal alignment layers may be configured for the display device to operate in either a twisted nematic (TN) mode or a fringe field switching (FFS) mode, or other modes as may be warranted for any particular application.

For example, FIGS. 24A and 24B depict an LCD configuration that includes a quantum rod block copolymer layer, and having the layers arranged in a twisted nematic (TN) mode configuration. FIG. 24A corresponds to the LCD layer stack configuration 50 of FIG. 16A in which the quantum rod block copolymer layer 66 is located on the viewing side of the liquid crystal layer 62, and FIG. 24B corresponds to the LCD layer stack configuration 50b of FIG. 17A in which the quantum rod block copolymer layer 66 is located on the non-viewing side of the liquid crystal layer 62. It will be appreciated that comparable principles may be applied to other LCD layer stack configurations that are described in this application, including embodiments in which the quantum rod block copolymer layer is patterned for multiple color emission.

In these figures, the arrows and cross indications of the polarizer layers denote the transmission axes of the polarizers, of the quantum rod block copolymer layer denotes the emission axis of the quantum rod block copolymer layer, and of the alignment layers denotes the alignment direction imposed upon the liquid crystal layer. Dual axis direction indications denote alternative embodiments.

For the TN mode configuration of FIGS. 24A and 24B, the transmission axes of the polarizers 56 and 70 are crossed. The emission axis of the quantum rod block copolymer layer 66 is parallel to the transmission axis of the nearest polarizer, which is the front polarizer 70 in the embodiment of FIG. 24A and the rear polarizer 56 in the embodiment of FIG. 24B. The alignment directions of the alignment layers 60 and 64 are at 90° relative to each other. The alignment direction of the alignment layers may be independent of the transmission axes of the polarizer layers, as illustrated by the dual directional indications of the figures. A rubbing direction parallel to the front polarizer is preferred for minimization of reflections.

As another example, FIGS. 25A-25D depict an LCD configuration that includes a quantum rod block copolymer layer, and having the layers arranged in a fringe field switching (FFS) mode configuration. FIGS. 25A and 25C correspond to the LCD layer stack configuration 50 of FIG. 16A in which the quantum rod block copolymer layer 66 is located on the viewing side of the liquid crystal layer 62, and FIGS. 25B and 25D correspond to the LCD layer stack configuration 50b of FIG. 17A in which the quantum rod block copolymer layer 66 is located on the non-viewing side of the liquid crystal layer 62. It will be appreciated that comparable principles may be applied to other LCD layer stack configurations that are described in this application, including embodiments in which the quantum rod block copolymer layer is patterned for multiple color emission.

Also in these figures, the arrows and cross indications of the polarizer layers denote the transmission axes of the polarizers, of the quantum rod block copolymer layer denotes the emission axis of the quantum rod block copolymer layer, and of the alignment layers denotes the alignment direction imposed upon the liquid crystal layer. In addition, in this series of figures the arrow indication shown on the non-viewing side substrate 58 denotes an angle of the segmented electrodes that are incorporated into said substrate, i.e., the direction in which the electric field vector in the x-y plane would point.

For the FFS mode configuration of FIGS. 25A-25D, the transmission axes of the polarizers 56 and 70 are crossed. The emission axis of the quantum rod block copolymer layer 66 is parallel to the transmission axis of the nearest polarizer, which is the front polarizer 70 in the embodiments of FIGS. 25A and 25C and the rear polarizer 56 in the embodiments of FIGS. 25B and 25D. The alignment directions of the alignment layers 60 and 64 are parallel to each other and are parallel to the transmission axis of one of the polarizers 56 (embodiments of FIGS. 25B and 25C) or 70 (embodiments of FIGS. 25A and 25D). The alignment direction of the alignment layers 60 and 64 is perpendicular to the electrode direction of the segmented electrode layer that is incorporated into the non-viewing side substrate 58. While the figures indicate that such alignment direction of the alignment layers is perpendicular to the electrode direction, in practice the angle is approximately 90°, and more commonly tends to be approximately 85°, as is known in the art.

As variations that satisfy such directional constraints for FFS operation, in the example of FIG. 25A, the quantum rod block copolymer layer 66 is on a viewing side of the liquid crystal layer 62 and the alignment direction of the alignment layers 60 and 64 is parallel to the emission axis of the quantum rod block copolymer layer. In the example of FIG. 25B, the quantum rod block copolymer layer 66 is on a backlight (non-viewing) side of the liquid crystal layer 62 and the alignment direction of the alignment layers 60 and 64 is parallel to the emission axis of the quantum rod block copolymer layer. In the example of FIG. 25C, the quantum rod block copolymer layer 66 is on a viewing side of the liquid crystal layer 62 and the alignment direction of the alignment layers 60 and 64 is perpendicular to the emission axis of the quantum rod block copolymer layer. In the example of FIG. 25D, the quantum rod block copolymer layer 66 is on a backlight (non-viewing) side of the liquid crystal layer 62 and the alignment direction of the alignment layers 60 and 64 is perpendicular to the emission axis of the quantum rod block copolymer layer.

An aspect of the invention is a quantum rod (or other suitable nanorod) display in which enhanced alignment of the quantum rods is achieved by employing an aligned block copolymer material to align the quantum rods. The display device may be a transflective display device. In exemplary embodiments, a display includes a liquid crystal layer and a nanorod structure optically coupled to the liquid crystal layer. The nanorod structure includes an aligned block copolymer material including a first polymer strain and a second polymer strain that are aligned relative to each other, and nanorods that are embedded within either the first polymer strain or the second polymer strain, and the nanorods are aligned by the alignment of the polymer strain in which the nanorods are embedded. The display may include one or more of the following features, either individually or in combination.

In an exemplary embodiment of the display, the nanorod structure is on a viewing side of the liquid crystal layer.

In an exemplary embodiment of the display, the nanorod structure has polarization properties and functions as a front polarizer.

In an exemplary embodiment of the display, the nanorod structure is on a non-viewing side of the liquid crystal layer.

In an exemplary embodiment of the display, the nanorod structure has a liquid crystal alignment surface and functions as a liquid crystal alignment layer.

In an exemplary embodiment of the display, the nanorod structure is unpatterned.

In an exemplary embodiment of the display, the nanorod structure is patterned into regions, and at least two of the regions include nanorods that emit light of different colors.

In an exemplary embodiment of the display, the regions include a red emitting region, a green emitting region, and a blue emitting region.

In an exemplary embodiment of the display, at least one of the regions has no nanorods.

In an exemplary embodiment of the display, the nanorod structure further comprises a block copolymer alignment layer for aligning the block copolymer material.

In an exemplary embodiment of the display, the nanorods include a chemically bonded functionalization ligand that renders the nanorods preferentially soluble into the polymer strain in which the nano rods are aligned.

In an exemplary embodiment of the display, the display further includes a front polarizer on a viewing side of the liquid crystal layer and the nanorod structure; and a rear polarizer on a non-viewing side of the liquid crystal layer and the nanorod structure.

In an exemplary embodiment of the display, the display further includes a first alignment layer on a non-viewing side of the liquid crystal layer and a second alignment layer on a viewing side of the liquid crystal layer, wherein the first and second alignment layers align the liquid crystal layer.

In an exemplary embodiment of the display, transmission axes of the front and rear polarizers are crossed, and an emission axis of the nanorod structure is parallel to the transmission axis of either the front or rear polarizer that is nearest to the nanorod structure.

In an exemplary embodiment of the display, an alignment direction of the first alignment layer is at 90° relative to an alignment direction of the second alignment layer.

In an exemplary embodiment of the display, an alignment direction of the first alignment layer is parallel to an alignment direction of the second alignment layer, and said alignment direction further is parallel to the transmission axis of either the first polarizer or the second polarizer.

In an exemplary embodiment of the display, the display further includes a substrate layer on a non-viewing side of the liquid crystal layer and including a segmented electrode layer, wherein the alignment direction of the first and second alignment layers is perpendicular to an electrode direction of the segmented electrode layer.

In an exemplary embodiment of the display, the nanorod structure comprises: a nanorod block copolymer layer including the aligned block copolymer material and the nanorods; and one or more of a rear polarizer, a copolymer aligning layer that aligns the block copolymer material, an encapsulation layer, and a front polarizer.

In an exemplary embodiment of the display, the nanorod structure comprises a layer structure that includes from the non-viewing side: a first substrate; a rear polarizer; a first copolymer aligning and encapsulation layer; the nanorod block copolymer layer; a second copolymer aligning and encapsulation layer; a front polarizer; and a second substrate.

In an exemplary embodiment of the display, transmission axes of the front and rear polarizers are parallel to each other and parallel to an emission axis of the nanorod block copolymer layer.

In an exemplary embodiment of the display, comprises: a nanorod block copolymer layer including the aligned block copolymer material and the nanorods deposited on a substrate; and one or more of a common electrode layer, a segmented electrode layer, and an insulator layer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention relate to configurations and operation of many LCD devices in which high image quality is required for all ambient lighting conditions. Examples of such devices include mobile phones including smartphones, personal digital assistants (PDAs), tablets, laptop computers, televisions, public information displays, and the like.

REFERENCE SIGNS LIST

2—nanorod object
3—long axis
4—viewing direction
5—short axis
6—generalized LCD device
10—configuration of a columnar block copolymer phase
10a—alternative configuration of a columnar block copolymer phase
10b—alternative configuration of a columnar block copolymer phase
12—substrate
14—first polymer strain
16—second polymer strain
18—alignment layer
20—alignment structures
22—nanorods
24—alignment of first nanorods
26—alignment of second nanorods
30—LCD device
32—viewing direction
34—backlight
36—quantum rod structure
38—liquid crystal layer
40—rear (non-viewing side) film
42—quantum rod block copolymer layer
44—front (viewing side) film
50/50a-h—LCD display device configurations
52—viewing direction
54—backlight unit
56—backlight side polarizer
58—backlight side substrate
60—backlight side alignment layer
62—liquid crystal layer
64—viewing side alignment layer
66—unpatterned aligned quantum rod block copolymer layer
66R—red quantum rod region
66G—green quantum rod region
66B—blue quantum rod region
660—transparent region
68—viewing side substrate
70—viewing side polarizer
80—quantum rod structure
82—rear polarizer layer
84—copolymer aligning layer
86—quantum rod block copolymer layer
88—encapsulation layer
90—front polarizer layer
100—quantum rod layer structure
102—substrate
104—quantum rod block copolymer layer
106—common electrode layer
108—insulator layer
110—segmented electrode layer
112—quantum rod layer structure
114—substrate layer
116—rear polarizer layer
118—copolymer aligning and encapsulation layer
120—quantum rod block copolymer
122—second copolymer and encapsulation layer
124—front polarizer layer
126—second (viewing side) substrate layer

The invention claimed is:

1. A display comprising:
    a liquid crystal layer; and
    a nanorod structure optically coupled to the liquid crystal layer;
    wherein the nanorod structure comprises:
    an aligned block copolymer material including a first polymer strain covalently bonded to a second polymer strain that are aligned relative to each other; and
    nanorods that are embedded within either the first polymer strain or the second polymer strain, and the nanorods are aligned by the alignment of the polymer strain in which the nanorods are embedded;
    wherein the nanorod structure further comprises:
        a nanorod block copolymer layer including the aligned block copolymer material and the nanorods; and
        one or more of a rear polarizer, a copolymer aligning layer that aligns the aligned block copolymer material, an encapsulation layer, and a front polarizer; and
    wherein the nanorod structure comprises a layer structure that includes from the non-viewing side:
        a first substrate;
        the rear polarizer;
        a first copolymer aligning and encapsulation layer;
        the nanorod block copolymer layer;
        a second copolymer aligning and encapsulation layer;
        the front polarizer; and
        a second substrate.

2. The display of claim 1, wherein the nanorod structure is on a viewing side of the liquid crystal layer.

3. The display of claim 2, wherein the nanorod structure has polarization properties and functions as a front polarizer.

4. The display of claim 1, wherein the nanorod structure is on a non-viewing side of the liquid crystal layer.

5. The display of claim 4, wherein the nanorod structure has a liquid crystal alignment surface and functions as a liquid crystal alignment layer.

6. The display of claim 1, wherein the nanorod structure is unpatterned.

7. The display of claim 1, wherein the nanorod structure is patterned into regions, and at least two of the regions include nanorods that emit light of different colors.

8. The display of claim 7, wherein at least one of the regions has no nanorods.

9. The display of claim 1, wherein the nanorod structure further comprises a block copolymer alignment layer for aligning the aligned block copolymer material.

10. The display of claim 1, wherein the nanorods include a chemically bonded functionalization ligand that renders the nanorods preferentially soluble into the polymer strain in which the nanorods are aligned.

11. The display of claim 1, further comprising:
    a front polarizer on a viewing side of the liquid crystal layer and the nanorod structure; and
    a rear polarizer on a non-viewing side of the liquid crystal layer and the nanorod structure.

12. The display of claim 11, further comprising a first alignment layer on a non-viewing side of the liquid crystal layer and a second alignment layer on a viewing side of the liquid crystal layer, wherein the first and second alignment layers align the liquid crystal layer.

13. The display of claim 11, wherein transmission axes of the front and rear polarizers are crossed, and an emission axis of the nanorod structure is parallel to the transmission axis of either the front or rear polarizer that is nearest to the nanorod structure.

14. The display of claim 13, wherein an alignment direction of the first alignment layer is at 90° relative to an alignment direction of the second alignment layer.

15. The display of claim 13, wherein an alignment direction of the first alignment layer is parallel to an alignment direction of the second alignment layer, and said alignment direction further is parallel to the transmission axis of either the first polarizer or the second polarizer.

16. The display of claim 15, further comprising a substrate layer on a non-viewing side of the liquid crystal layer and including a segmented electrode layer, wherein the alignment direction of the first and second alignment layers is perpendicular to an electrode direction of the segmented electrode layer.

17. The display of claim 1, wherein transmission axes of the front and rear polarizers are parallel to each other and parallel to an emission axis of the nanorod block copolymer layer.

18. The display of claim 1, wherein the nanorod structure comprises:
    a nanorod block copolymer layer including the aligned block copolymer material and the nanorods deposited on a substrate; and
    one or more of a common electrode layer, a segmented electrode layer, and an insulator layer.

* * * * *